United States Patent
Sakai et al.

(10) Patent No.: US 9,655,150 B2
(45) Date of Patent: May 16, 2017

(54) COMMUNICATION APPARATUS AND COMMUNICATION METHOD

(71) Applicant: CANON KABUSHIKI KAISHA, Tokyo (JP)

(72) Inventors: Tatsuhiko Sakai, Tokyo (JP); Kenichi Fujii, Tokyo (JP); Mitsuhiro Watanabe, Kanagawa-ken (JP); Kazuo Moritomo, Kanagawa-ken (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/032,798

(22) Filed: Sep. 20, 2013

(65) Prior Publication Data

US 2014/0023061 A1    Jan. 23, 2014

Related U.S. Application Data

(63) Continuation of application No. 11/409,020, filed on Apr. 24, 2006, now Pat. No. 8,572,222.

(30) Foreign Application Priority Data

Apr. 27, 2005 (JP) .................. 2005-130480

(51) Int. Cl.
*H04W 76/02* (2009.01)
*H04W 8/00* (2009.01)
(Continued)

(52) U.S. Cl.
CPC ......... *H04W 76/021* (2013.01); *H04L 67/125* (2013.01); *H04L 67/303* (2013.01);
(Continued)

(58) Field of Classification Search
CPC .................. H04W 76/021; H04L 67/125
(Continued)

(56) References Cited

U.S. PATENT DOCUMENTS

| 4,843,633 A * | 6/1989 | Menich ................ H04W 24/00 455/422.1 |
| 4,998,245 A | 3/1991 | Tanaka et al. ............... 370/85.1 |

(Continued)

FOREIGN PATENT DOCUMENTS

| CN | 1571333 | 1/2005 |
| CN | 1574673 | 2/2005 |

(Continued)

OTHER PUBLICATIONS

Anastasi et al., "IEEE 802.11 Ad Hoc Netwrosk: Protocols, Performance and Open Issues", 2003.*

(Continued)

*Primary Examiner* — O. C. Vostal
(74) *Attorney, Agent, or Firm* — Fitzpatrick, Cella, Harper & Scinto

(57) ABSTRACT

In a communication apparatus on a network where communication apparatuses perform direct communication with each other, a network management apparatus for managing the network based on message information transmitted and received on the network is determined. When the communication apparatus itself is determined as the network management apparatus, the apparatus collects information indicating device capabilities from other communication apparatuses. On the other hand, the communication apparatus receives information indicating device capabilities from another communication apparatus when the other communication apparatus is determined as the network management apparatus.

8 Claims, 43 Drawing Sheets

(51) Int. Cl.
*H04W 40/24* (2009.01)
*H04L 29/08* (2006.01)
*H04L 29/06* (2006.01)
*H04W 12/02* (2009.01)
*H04W 84/18* (2009.01)

(52) U.S. Cl.
CPC .......... *H04W 8/005* (2013.01); *H04W 40/24* (2013.01); *H04L 63/04* (2013.01); *H04L 63/08* (2013.01); *H04W 12/02* (2013.01); *H04W 84/18* (2013.01)

(58) Field of Classification Search
USPC .......................................................... 709/223
See application file for complete search history.

(56) References Cited

U.S. PATENT DOCUMENTS

| | | | |
|---|---|---|---|
| 5,053,964 A * | 10/1991 | Mister et al. | 701/19 |
| 5,341,497 A * | 8/1994 | Younger | 714/51 |
| 5,365,523 A | 11/1994 | Derby et al. | 370/85 |
| 5,530,807 A * | 6/1996 | Baker et al. | 709/226 |
| 5,583,983 A * | 12/1996 | Schmitter | 717/133 |
| 5,602,999 A * | 2/1997 | Hyatt | 711/1 |
| 5,704,032 A | 12/1997 | Badovinatz et al. | 395/182.02 |
| 5,822,361 A | 10/1998 | Nakamura et al. | 375/202 |
| 5,886,894 A | 3/1999 | Rakoff | 364/132 |
| 5,948,111 A * | 9/1999 | Taylor | G06F 1/12 714/10 |
| 5,996,003 A | 11/1999 | Namikata et al. | 709/205 |
| 6,026,303 A | 2/2000 | Minamisawa | 455/446 |
| 6,157,465 A | 12/2000 | Suda et al. | 358/407 |
| 6,178,323 B1 | 1/2001 | Nagata | 455/416 |
| 6,184,829 B1 * | 2/2001 | Stilp | G01S 5/02 342/174 |
| 6,216,189 B1 * | 4/2001 | Kim | G06F 11/0745 710/113 |
| 6,263,362 B1 * | 7/2001 | Donoho | G06Q 10/10 709/206 |
| 6,397,061 B1 * | 5/2002 | Jordan | H04L 1/0002 455/421 |
| 6,477,570 B1 | 11/2002 | Takayama et al. | 709/224 |
| 6,502,155 B1 * | 12/2002 | Kondo | G06F 1/14 455/403 |
| 6,653,933 B2 * | 11/2003 | Raschke et al. | 370/203 |
| 6,785,713 B1 | 8/2004 | Freeman et al. | 709/208 |
| 6,792,611 B2 | 9/2004 | Honishi et al. | 719/328 |
| 6,842,460 B1 * | 1/2005 | Olkkonen | H04W 48/16 370/328 |
| 6,868,442 B1 | 3/2005 | Burdeau | 709/223 |
| 6,873,846 B1 * | 3/2005 | Gerber | H04W 4/02 455/404.2 |
| 6,876,643 B1 * | 4/2005 | Aggarwal et al. | 370/338 |
| 6,886,095 B1 | 4/2005 | Hind et al. | 713/168 |
| 6,985,740 B2 | 1/2006 | Shyy et al. | 455/453 |
| 6,986,046 B1 | 1/2006 | Tuvell et al. | 713/171 |
| 6,993,413 B2 * | 1/2006 | Sunaoshi | G06F 19/3406 318/568.17 |
| 7,024,204 B2 | 4/2006 | Nakakita et al. | 455/453 |
| 7,039,358 B1 * | 5/2006 | Shellhammer | H04W 16/14 455/41.2 |
| 7,065,526 B2 | 6/2006 | Wissner et al. | 707/10 |
| 7,070,250 B2 * | 7/2006 | Lester et al. | 347/4 |
| 7,075,919 B1 | 7/2006 | Wendt et al. | 370/352 |
| 7,134,131 B1 | 11/2006 | Hendricks et al. | 725/31 |
| 7,218,644 B1 * | 5/2007 | Heinonen | H04B 1/7143 370/468 |
| 7,324,644 B2 | 1/2008 | Saito | 380/200 |
| 7,359,950 B2 | 4/2008 | Choi et al. | 709/223 |
| 7,461,130 B1 | 12/2008 | AbdelAziz et al. | 709/208 |
| 7,506,047 B2 | 3/2009 | Wiles, Jr. | 709/224 |
| 7,555,264 B2 | 6/2009 | Ishiwata et al. | 455/39 |
| 7,587,465 B1 | 9/2009 | Muchow | 709/209 |
| 7,603,710 B2 | 10/2009 | Harvey et al. | 726/23 |
| 7,684,783 B1 | 3/2010 | Vacon et al. | 455/410 |
| 7,756,994 B2 | 7/2010 | Yumoto | 709/223 |
| 7,797,367 B1 | 9/2010 | Gelvin et al. | 709/200 |
| 7,814,195 B2 * | 10/2010 | Dacosta | H04L 29/06027 370/466 |
| 7,818,480 B2 | 10/2010 | Hoerl et al. | 710/62 |
| 7,849,150 B2 | 12/2010 | Loeebbert et al. | 709/208 |
| 7,882,196 B2 | 2/2011 | Fujii et al. | 709/208 |
| 8,024,404 B2 * | 9/2011 | Ozzie | G06F 17/30168 370/352 |
| 8,073,923 B2 | 12/2011 | Sasaki et al. | 709/209 |
| 8,126,914 B2 | 2/2012 | Tate et al. | 707/781 |
| 9,544,929 B2 * | 1/2017 | Goto | H04W 76/023 |
| 2001/0029530 A1 | 10/2001 | Naito et al. | 709/223 |
| 2001/0047435 A1 * | 11/2001 | Dove | 709/310 |
| 2002/0004872 A1 | 1/2002 | Ono | 710/305 |
| 2002/0019786 A1 * | 2/2002 | Gonzalez et al. | 705/28 |
| 2002/0055999 A1 * | 5/2002 | Takeda | H04L 41/5009 709/224 |
| 2002/0107852 A1 * | 8/2002 | Oblinger | 707/5 |
| 2002/0120733 A1 * | 8/2002 | Kring | G06F 17/30356 709/223 |
| 2002/0147819 A1 * | 10/2002 | Miyakoshi | H04L 29/06 709/228 |
| 2002/0149481 A1 * | 10/2002 | Shanks | G06K 7/0008 340/572.1 |
| 2002/0150383 A1 | 10/2002 | Kato et al. | 386/69 |
| 2002/0162005 A1 * | 10/2002 | Ueda et al. | 713/182 |
| 2002/0169846 A1 | 11/2002 | Chen et al. | 709/209 |
| 2003/0037033 A1 | 2/2003 | Nyman et al. | 707/1 |
| 2003/0046345 A1 | 3/2003 | Wada et al. | 709/205 |
| 2003/0065805 A1 * | 4/2003 | Barnes, Jr. | G06Q 10/02 709/231 |
| 2003/0100335 A1 | 5/2003 | Gassho et al. | 455/552 |
| 2003/0177219 A1 | 9/2003 | Taib et al. | 709/223 |
| 2003/0191608 A1 * | 10/2003 | Anderson et al. | 702/189 |
| 2003/0191814 A1 | 10/2003 | Tran | 709/217 |
| 2003/0212820 A1 | 11/2003 | deCarmo | 709/238 |
| 2003/0220835 A1 * | 11/2003 | Barnes, Jr. | 705/14 |
| 2003/0223377 A1 * | 12/2003 | Simmons | H04L 12/40169 370/254 |
| 2004/0019681 A1 | 1/2004 | Nakamura et al. | 709/226 |
| 2004/0024831 A1 | 2/2004 | Yang et al. | 709/208 |
| 2004/0030449 A1 * | 2/2004 | Solomon | B64C 39/024 700/245 |
| 2004/0088294 A1 * | 5/2004 | Lerhaupt | 707/8 |
| 2004/0114607 A1 * | 6/2004 | Shay et al. | 370/395.42 |
| 2004/0117377 A1 * | 6/2004 | Moser et al. | 707/10 |
| 2004/0184473 A1 * | 9/2004 | Tavli | H04W 72/1289 370/445 |
| 2004/0208029 A1 * | 10/2004 | Caruthers | G08C 19/00 363/72 |
| 2004/0215752 A1 | 10/2004 | Satapati et al. | 703/223 |
| 2004/0218580 A1 | 11/2004 | Bahl et al. | 370/350 |
| 2004/0223470 A1 * | 11/2004 | Smith | H04L 63/10 370/332 |
| 2004/0223503 A1 | 11/2004 | Lynch et al. | 370/404 |
| 2004/0225762 A1 * | 11/2004 | Poo | G06F 13/36 710/36 |
| 2004/0236953 A1 | 11/2004 | Merenne et al. | 713/182 |
| 2004/0242149 A1 * | 12/2004 | Luneau | H04K 3/45 455/1 |
| 2004/0242250 A1 * | 12/2004 | Sasai | H04W 56/002 455/502 |
| 2004/0255000 A1 | 12/2004 | Simionescu et al. | 709/208 |
| 2004/0259499 A1 * | 12/2004 | Oba | H04M 1/7253 455/41.2 |
| 2004/0259552 A1 | 12/2004 | Ihori et al. | 455/455 |
| 2004/0260800 A1 | 12/2004 | Gu et al. | 709/223 |
| 2005/0014467 A1 * | 1/2005 | Ishiwata | H04W 84/20 455/39 |
| 2005/0015805 A1 | 1/2005 | Iwamura | 725/79 |
| 2005/0021684 A1 | 1/2005 | Hsue et al. | 709/220 |
| 2005/0025117 A1 * | 2/2005 | Inagaki et al. | 370/350 |
| 2005/0030798 A1 * | 2/2005 | Lim | G11C 11/4076 365/190 |
| 2005/0030967 A1 * | 2/2005 | Ohmi et al. | 370/445 |
| 2005/0033816 A1 * | 2/2005 | Yamaguchi et al. | 709/208 |

(56) References Cited

U.S. PATENT DOCUMENTS

| | | | |
|---|---|---|---|
| 2005/0037789 A1* | 2/2005 | Rhee | H04W 40/246 455/507 |
| 2005/0055469 A1* | 3/2005 | Scheele | 710/1 |
| 2005/0060419 A1 | 3/2005 | Fujii et al. | 709/230 |
| 2005/0066097 A1* | 3/2005 | Kawamoto et al. | 710/240 |
| 2005/0066197 A1 | 3/2005 | Hirata et al. | 713/201 |
| 2005/0075084 A1 | 4/2005 | Salokannel et al. | |
| 2005/0080796 A1 | 4/2005 | Midgley | 707/100 |
| 2005/0086273 A1* | 4/2005 | Loebbert et al. | 707/204 |
| 2005/0086514 A1* | 4/2005 | Han et al. | 713/200 |
| 2005/0094574 A1* | 5/2005 | Han | H04L 29/06 370/254 |
| 2005/0094608 A1* | 5/2005 | Yokota | H04W 88/06 370/338 |
| 2005/0097356 A1 | 5/2005 | Zilliacus et al. | 713/201 |
| 2005/0099438 A1* | 5/2005 | Lester et al. | 347/4 |
| 2005/0116834 A1* | 6/2005 | Block | H04B 1/7156 340/4.21 |
| 2005/0148326 A1 | 7/2005 | Nogawa et al. | 455/420 |
| 2005/0163093 A1* | 7/2005 | Garg | H04W 76/025 370/342 |
| 2005/0206236 A1* | 9/2005 | Mori | B60T 8/4872 303/175 |
| 2005/0238046 A1 | 10/2005 | Hassan et al. | 370/465 |
| 2005/0256934 A1 | 11/2005 | Motoyama | 709/208 |
| 2005/0276114 A1* | 12/2005 | Tsunekazu | G06F 13/385 365/185.22 |
| 2006/0012476 A1* | 1/2006 | Markhovsky | G01S 13/74 340/539.32 |
| 2006/0069594 A1 | 3/2006 | Yamasaki | 705/7 |
| 2006/0148516 A1 | 7/2006 | Reddy et al. | 455/552.1 |
| 2006/0153385 A1 | 7/2006 | Klein | 380/270 |
| 2006/0155827 A1 | 7/2006 | Prehofer et al. | 709/220 |
| 2006/0158518 A1 | 7/2006 | Sakai | 348/207.2 |
| 2006/0171537 A1* | 8/2006 | Enright | H04L 63/0428 380/270 |
| 2006/0187865 A1* | 8/2006 | Sakai | H04W 52/50 370/311 |
| 2006/0200564 A1 | 9/2006 | Watanabe et al. | 709/227 |
| 2006/0206592 A1 | 9/2006 | Fujii et al. | 709/220 |
| 2006/0242304 A1 | 10/2006 | Hirose et al. | 709/227 |
| 2006/0246946 A1 | 11/2006 | Moritomo et al. | 455/557 |
| 2006/0246947 A1* | 11/2006 | Fujii | H04W 28/18 455/557 |
| 2006/0291404 A1 | 12/2006 | Thubert et al. | 370/254 |
| 2007/0002867 A1 | 1/2007 | Shitano et al. | 370/395.5 |
| 2007/0043844 A1* | 2/2007 | Sakai | H04L 12/2803 709/223 |
| 2007/0089110 A1* | 4/2007 | Li | H04L 67/2847 717/178 |
| 2007/0094414 A1 | 4/2007 | Das | 709/248 |
| 2007/0109989 A1 | 5/2007 | Nakagawa et al. | 370/328 |
| 2007/0112961 A1 | 5/2007 | Brun et al. | 709/227 |
| 2007/0174436 A1 | 7/2007 | Maekawa et al. | 709/223 |
| 2007/0223398 A1 | 9/2007 | Luo et al. | 370/254 |
| 2008/0043686 A1* | 2/2008 | Sperti et al. | 370/338 |
| 2008/0092204 A1* | 4/2008 | Bryce | H04N 7/163 725/143 |
| 2008/0261580 A1 | 10/2008 | Wallentin et al. | 455/418 |
| 2009/0088133 A1 | 4/2009 | Orlassino | 455/411 |
| 2010/0226788 A1 | 9/2010 | Liang | 416/97 |
| 2015/0230168 A1* | 8/2015 | Sawai | H04W 48/20 370/254 |
| 2015/0269823 A1* | 9/2015 | Yamanishi | G08B 21/22 340/539.11 |

FOREIGN PATENT DOCUMENTS

| | | | |
|---|---|---|---|
| CN | 1602606 | 3/2005 | |
| EP | 1 107 522 A1 | 6/2001 | H04L 12/56 |
| EP | 1460800 | 9/2004 | |
| EP | 1 487 155 | 12/2004 | |
| JP | 06-350652 A | 12/1994 | |
| JP | 10-145276 | 5/1998 | |
| JP | 11-146030 | 5/1999 | |
| JP | 2001-014119 A | 1/2001 | |
| JP | 2002-140304 A | 5/2002 | |
| JP | 2002-359623 A | 12/2002 | |
| JP | 2003-163668 A | 6/2003 | |
| JP | 2003-218875 A | 7/2003 | |
| JP | 2004-048493 A | 2/2004 | |
| JP | 2004-320162 A | 11/2004 | |
| JP | 2004/328289 | 11/2004 | |
| JP | 2005-027280 A | 1/2005 | |
| JP | 2005-65102 A | 3/2005 | |
| WO | WO 00/62485 | 10/2000 | |
| WO | 03/067813 A2 | 8/2003 | |
| WO | 2005-034434 A1 | 4/2005 | |

OTHER PUBLICATIONS

Anastasi et al., "IEEE 802.11 Ad Hoc Networks: Performance Measurements", 2003.*
Ferro et al., "Bluetooth and IEEE 802.11 Wireless Protocols: A Survey and a Comparison (*)", 2004.*
He et al., "1 Message Attack on the 4_way Handshake", 2004.*
He et al., "Analysis of the 802.11i 4-Way Handshake", 2004.*
Master et al., "802.11 Wireless LANs and Ad-hoc networks", 2005.*
Poole, "IEEE 802.11 Wi-Fi Standards", 2017.*
Wireless Networks, "IEEE 802.11 Wireless Networks", 2007.*
European Search Report dated Sep. 1, 2006, issued in corresponding EPO Application No. 06252253.7-2413.
Ritchie et al., "UPnP AV Architecture: 0.83", For Universal Plug and Play Version 1.0 Status: Preliminary Design (TPD), Design Document Microsoft, (Jun. 12, 2002) pp. 1-22, XP002271673.
A. Ayyagari, "Bluetooth ESDP for UPnP", Bluetooth Doc, [Online] (Feb. 1, 2001), pp. 1-59, XP002394106.
M. Kangas, "Authentication and Authorization in Universal Plug and Play Home Networks URL", Research Seminar on Telecommunications Software, (2002) pp. 1-12, XP007900020.

* cited by examiner

FIG. 10

| Index | SLAVE DEVICE MAC ADDRESS |
|---|---|
| 1 | 00:EF:24:38:62:53 |
| 2 | 00:EF:9F:38:78:AB |
| 3 | 00:ED:24:48:A5:E3 |
| 4 | 00:AF:14:58:C2:BA |
| 5 | 00:EC:2C:A8:D2:13 |
| 6 | 00:E5:2F:C8:E2:3F |

FIG. 19

| MASTER DEVICE MAC ADDRESS |
|---|
| 00:EF:2D:3A:A2:5E |

FIG. 31

| COMMUNICATION PARAMETER PROVIDER MAC ADDRESS |
|---|
| 00:EF:2D:3A:A2:5E |

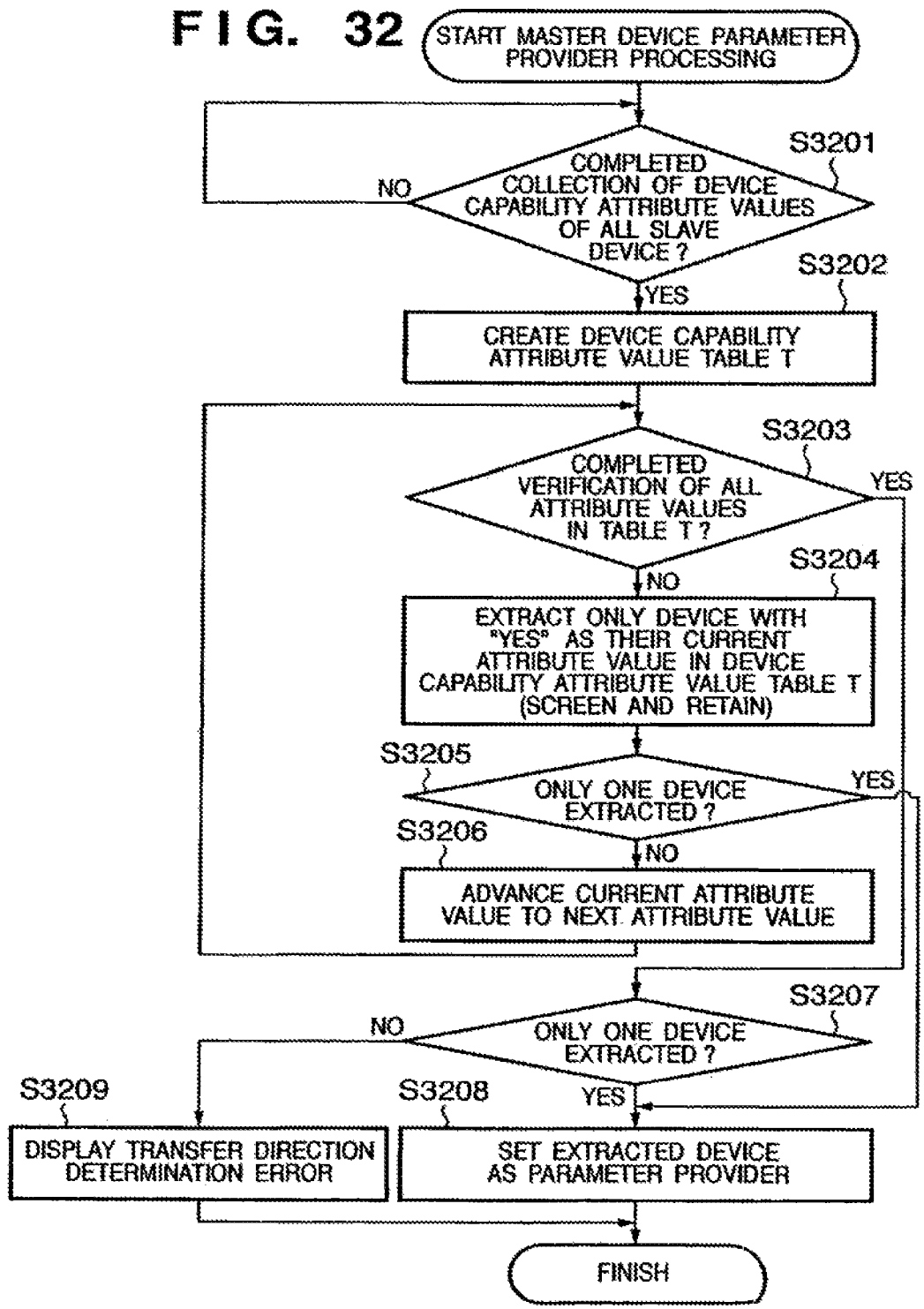

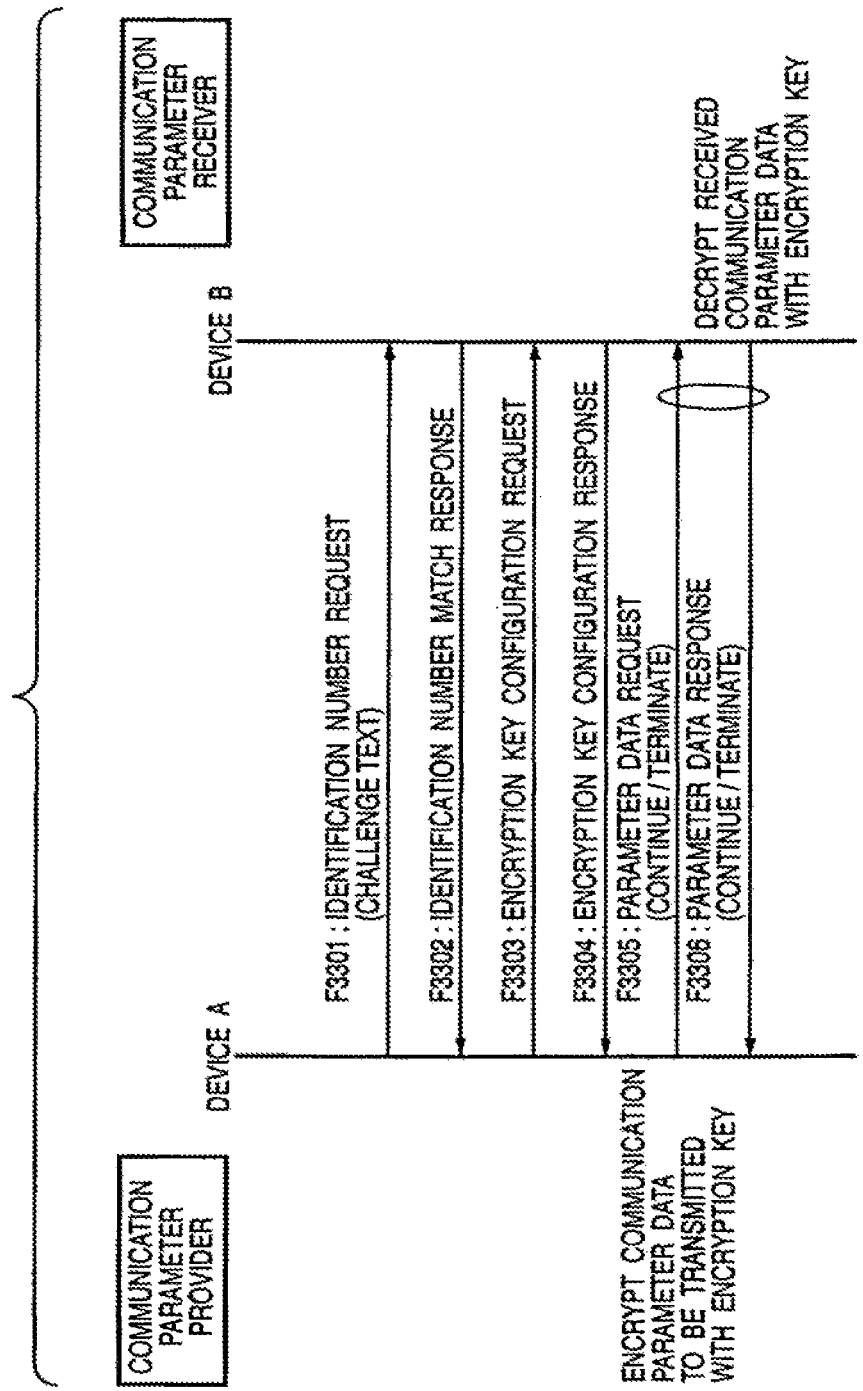

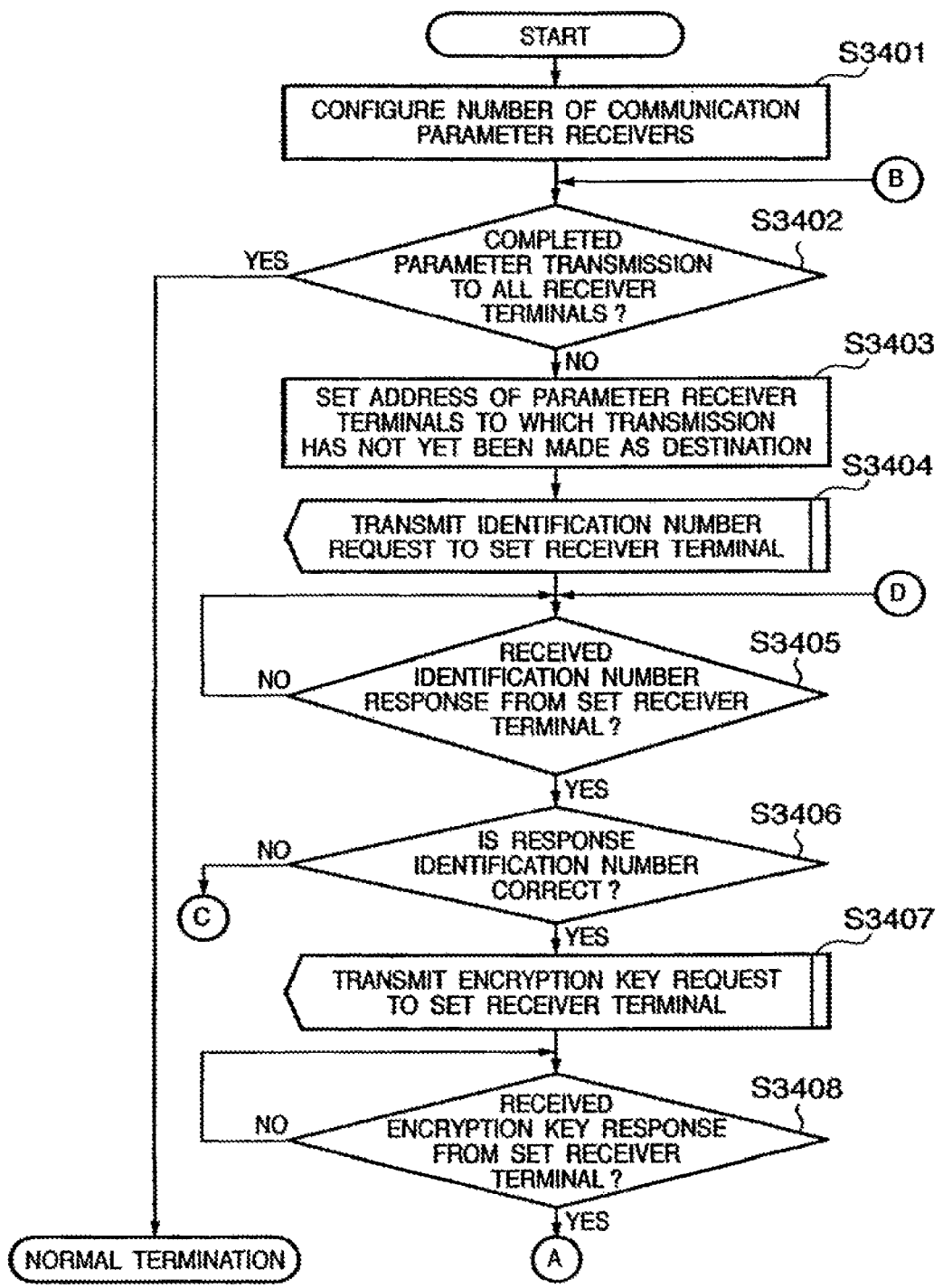

F I G. 38

| COMMUNICATION PARAMETER RECEIVER MAC ADDRESS |
|---|
| 00:EF:2D:3A:A2:5E |

FIG. 39

| Index | COMMUNICATION PARAMETER RECEIVER MAC ADDRESS |
|---|---|
| 1 | 00:EF:24:38:62:53 |
| 2 | 00:EF:9F:38:78:AB |
| 3 | 00:ED:24:48:A5:E3 |
| 4 | 00:AF:14:58:C2:BA |
| 5 | 00:EC:2C:A8:D2:13 |
| 6 | 00:E5:2F:C8:E2:3F |

COMMUNICATION APPARATUS AND COMMUNICATION METHOD

CROSS REFERENCE TO RELATED APPLICATIONS

This application is a continuation of U.S. application Ser. No. 11/409,020, filed Apr. 24, 2006, the entire disclosure of which is hereby incorporated herein by reference.

FIELD OF THE INVENTION

The present invention relates to a communication apparatus and a communication method in a network where communication apparatuses perform communication with other apparatuses.

BACKGROUND OF THE INVENTION

Methods have been proposed where configuration of wireless communication parameters such as SSIDs (Service Set Identifiers), which are network identifiers, encryption methods, encryption keys, authentication methods and authentication keys, generally considered cumbersome and complicated to users, is performed automatically. For instance, as for auto-configuration of a wireless LAN, a method requiring only simple operations for automatically transferring wireless parameter settings of an access point (relay station) and a station (terminal) from the relay station to the terminal has already been realized and commoditized.

Moreover, in recent years, communication over so-called ad hoc networks, where devices perform direct wireless communication with each other without having to go through a relay station, has become more and more common. Thus, demands for automization of wireless communication parameter configuration in ad hoc networks have been on the rise.

One of the problems encountered when performing wireless communication parameter configuration in a wireless LAN ad hoc network is that the lack of a mechanism for managing the statuses of the network devices, such as what kind of terminals joined or left the same network at what time, which prevents initiation of communication among a plurality of devices in such network environment, and makes it difficult to perform communication parameter configuration among the plurality of devices.

In regards to techniques for managing statuses of network devices, Patent Document 1 describes an operation involving selecting a leader device from the network nodes, and having the leader device manage a group in order to achieve network node group formation and maintenance. To be more specific, Patent Document 1 is U.S. Pat. No. 5,365,523 (Japanese Patent Laid-Open 06-350652).

When performing communication parameter configuration among a plurality of devices, in order to respond to such security demands as reducing the probability of network participation by unexpected terminals, or reducing power consumption at mobile terminals, it is preferred that the processing time for such configuration is kept at a minimum. In other words, it is desired that processing such as role determination or status detection of devices be performed in an expeditious manner even during device status management.

However, the above example of the conventional art does not consider such reduction of processing time, and is therefore inadequate to meet the aforementioned needs.

In addition, since the detection method in the above example of the conventional art involved verifying device statuses according to a preset interval, a problem exists where, for instance, the detachment of a device immediately following status verification can not be detected until the next verification, making prompt status detection impossible.

Furthermore, another problem with ad hoc networks is that due to the lack of a mechanism for keeping track of what kind of other devices are participating in the network and what capabilities the devices have, it is difficult to perform communication parameter configuration among devices according to the types and capabilities thereof in an environment as described above.

SUMMARY OF THE INVENTION

It is an object of the present invention to manage participation or detachment of communication apparatuses from a network in a swift and secure manner.

It is also an object of the present invention to automatically keep track of information that indicates the capabilities of a plurality of communication apparatuses participating in the network.

It is a further object of the present invention to provide a method for determining a management apparatus that manages a network on which an uncertain number of communication apparatuses exist.

According to an aspect of the present invention, the foregoing objects are attained by providing a communication apparatus comprising: a determination unit configured to determine a management apparatus that manages a network, based on message information received over the network, and a collection unit configured to collect device capability information of other communication apparatuses, based on the determination by the determination unit.

In addition, according to an aspect of the present invention, the foregoing objects are attained by providing a communication apparatus comprising: a detection unit configured to detect message information notifying the existence of a management apparatus that manages a network, and a transmission unit configured to transmit message information that notifies that the apparatus is a management object apparatus of the management apparatus, according to the detection results by the detection unit.

Moreover, according to an aspect of the present invention, the foregoing objects are attained by providing a communication apparatus comprising: a detection unit configured to detect message information notifying the existence of a management apparatus that manages a network, an operation unit configured to operate as the management apparatus according to detection results of the detection unit, a reception unit configured to receive message information that are autonomously transmitted by management object apparatuses of the management apparatus, and notifies that the apparatuses are management subject apparatuses, and a management unit configured to manage the management subject apparatuses based on message information received by the reception unit, wherein the management unit manages the existence of a management subject apparatus based on whether second message information, transmitted from the same communication apparatus, notifying the existence of the management subject apparatus is detected within a certain period of time after detecting first message information.

Furthermore, according to an aspect of the present invention, the foregoing objects are attained by providing a communication method comprising: a determination step of determining a management apparatus that manages a network, based on message information transmitted and received over the network, and a collection step of collecting device capability information of other communication apparatuses, based on the determination by the determination step.

In addition, according to an aspect of the present invention, the foregoing objects are attained by providing a communication method comprising: a detection step of detecting message information notifying the existence of a management apparatus that manages a network, and a transmission step of transmitting message information that notifies that the apparatus itself is a management object apparatus of the management apparatus, according to the detection results by the detection step.

In addition, according to an aspect of the present invention, the foregoing objects are attained by providing a communication method comprising: an operation step that enables the apparatus itself to operate as a management apparatus according to a detection of message information notifying the existence of a management apparatus that manages a network, and a management step of managing the management subject apparatuses based on message information that is autonomously transmitted by the management subject apparatuses of the management apparatus, and notifies that the apparatuses are management subject apparatuses, wherein the management means manages the existence of the management subject apparatus based on whether second message information, transmitted from the same communication apparatus, notifying the existence of the management subject apparatus is detected within a certain period of time after detecting first message information.

Other objects of the present invention will become apparent by the attached drawings and through the following detailed description.

BRIEF DESCRIPTION OF THE DRAWINGS

FIG. 10 is a diagram showing an example of a configuration of a slave device management table;

FIG. 19 is a diagram showing an example of a configuration of a master device management table;

FIG. 31 is a diagram showing the address of a communication parameter provider that is transmitted to a communication parameter receiver;

FIG. 32 is a flowchart showing communication parameter transfer direction determination processing;

FIG. 33 is a diagram showing a sequence for transmitting and receiving communication parameter data between a communication parameter provider and a receiver;

FIGS. 34A and 34B are flowcharts showing processing at a device that provides communication parameters;

FIG. 38 is a diagram showing the address of a communication parameter receiver that is transmitted to a communication parameter provider;

FIG. 39 is a diagram showing an address list of communication parameter receivers transmitted to a communication parameter provider.

DETAILED DESCRIPTION OF THE PREFERRED EMBODIMENTS

A detailed description of a preferred embodiment for implementing the present invention will now be provided with reference to the drawings.

First Embodiment

Figure 1:
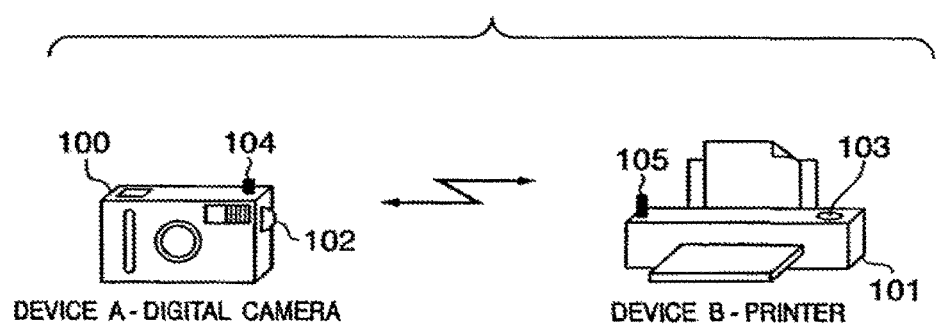
FIG. 1 is a diagram showing an example of a configuration of a wireless LAN according to a first embodiment.

FIG. 1 is a diagram showing an example of a configuration of a wireless LAN according to a first embodiment. As shown in FIG. 1, wireless communication device A is a digital camera 100 having an IEEE802.11 compliant wireless communication function 104. The digital camera 100 becomes capable of configuring a network in communication parameter configuration mode when a user presses a communication parameter configuration activation button 102. In addition, wireless communication device B is a printer 101 having an IEEE802.11 compliant wireless communication function 105, and alike device A, becomes capable of configuring a network in communication parameter configuration mode when the user presses a communication parameter configuration activation button 103.

Next, configurations and operations of the devices A and B having communication parameter configuration controlling functions will now be explained using FIGS. 2 and 3.

Figure 2:
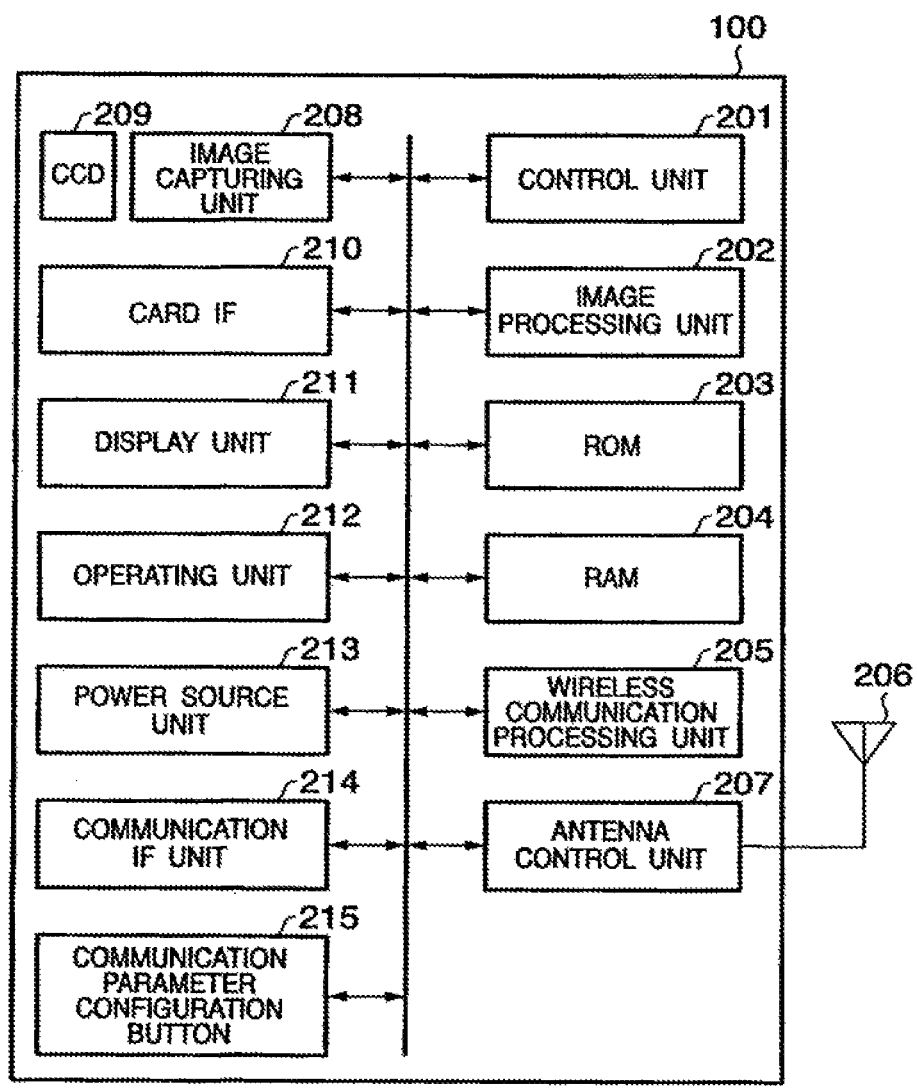
FIG. 2 is a schematic block diagram of an example of a configuration of a digital camera 100 (device A)

FIG. 2 is a schematic block diagram of an example of a configuration of the digital camera 100 (device A). In FIG. 2, reference numeral 201 denotes a control unit that controls the digital camera 100, 202 denotes an image processing unit, 203 denotes a ROM storing control instructions (programs) or control data, and 204 denotes a RAM. Configuration communication parameters for forming a communication parameter configuration network are stored in the RAM 204 in advance. 205 denotes a wireless communication processing unit, which performs communication control for the wireless LAN. 206 denotes an antenna, and 207 an antenna control unit.

Reference numeral 208 denotes an image capturing unit that captures image signals inputted from a CCD 209. 210 denotes a card interface that controls a storage media card for storing captured images or configuration information, while 211 denotes a display unit. 212 denotes an operating unit, and includes buttons for issuing instructions on shooting, playback, configuration and the like. 213 denotes a power source unit that includes a secondary battery. 214 denotes a non-wireless communication interface, and comprises a wired interface such as USB or IEEE1394. 215 denotes a communication parameter configuration button that activates communication parameter configuration.

Figure 3:
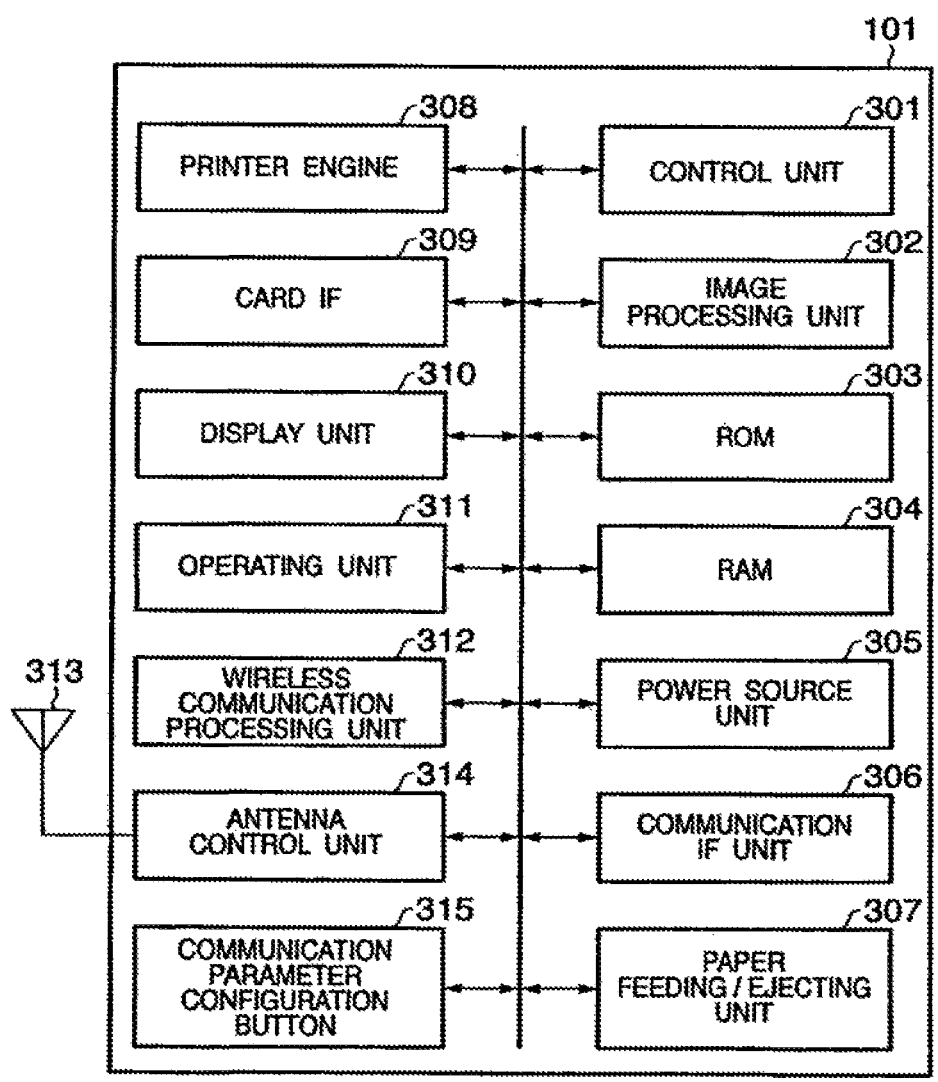
FIG. 3 is a schematic block diagram of an example of a configuration of a printer 101 (device B)

FIG. 3 is a schematic block diagram of an example of a configuration of the printer 101 (device B). In FIG. 3, reference numeral 301 denotes a control unit for controlling the printer 101, 302 denotes an image processing unit 302, 303 denotes a ROM storing control instructions (programs) or control data, 304 denotes a RAM, and 305 denotes a power source unit. Configuration communication parameters for forming a communication parameter configuration network are stored in the RAM 304 in advance. 306 denotes a non-wireless communication interface, and comprises a wired interface such as USB or IEEE1394.

Reference numeral 307 denotes a paper feeding/ejecting unit that feeds and ejects printer paper. 308 denotes a printer engine that performs printing control using methods such as the electro-photographic method or the inkjet method. 309 denotes a card interface that controls a storage media storing images, while 310 denotes a display unit. 311 denotes an operating unit that includes menu, configuration and other buttons. 312 denotes a wireless communication processing unit, which performs communication control for the wireless LAN. 313 denotes an antenna, and 314 an antenna control unit. 315 denotes a communication parameter configuration button that activates communication parameter configuration.

Next, processing for configuring wireless parameter data between devices A and B in an IEEE802.11 compliant wireless LAN ad hoc network will be described using FIG. 4.

Figure 4:
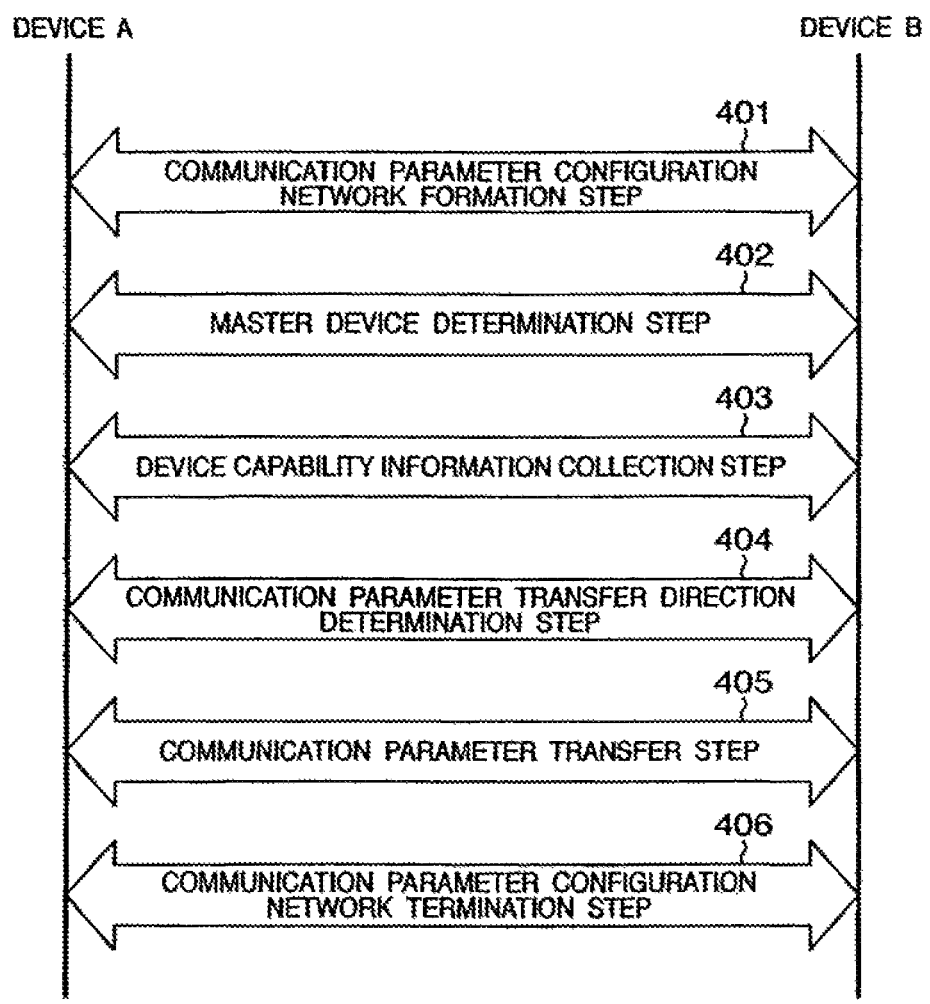
FIG. 4 is a diagram showing a wireless parameter configuration sequence according to the first embodiment.

FIG. 4 is a diagram showing a wireless parameter configuration sequence according to the first embodiment. For the following description, the overall processing flow will be divided into six steps, as shown in FIG. 4. Each step will now be explained in sequence.

<Communication Parameter Configuration Network Formation Step 401>

In this step, processing is performed for forming a communication parameter configuration network between devices A and B using ad hoc connection.

<Master Device Determination Step 402>

In this step, processing for determining which of the devices A and B will become a master device of the communication parameter configuration network and which of the devices will become a slave device is performed. In addition, each device will continuously perform processing for monitoring whether the other party exists on the same network.

<Device Capability Information Collection Step 403>

In this step, the master device determined in step 402 performs processing for collecting device capability attribute values owned by slave devices existing on the same network by making inquiries to the slave devices.

<Communication Parameter Transfer Direction Determination Step 404>

In this step, the master device compares its own device capability attribute values with those of each slave device collected by the master device in step 403. The master device determines which device will be the source of communication parameter transfer, and which device will be its destination. The master device also transfers information necessary for communication parameter transfer, such as destination or source information, to each slave device.

<Communication Parameter Transfer Step 405>

In this step, communication parameters are transferred from a device that is actually capable of providing communication parameters to a device that is actually capable of receiving communication parameters along the communication parameter transfer direction determined in step 404.

<Communication Parameter Configuration Network Termination Step 406>

In this step, prompted by the completion of the transfer in step 405, processing necessary to terminate the communication parameter configuration network will be performed. After the completion of the communication parameter configuration network termination step 406, a new network will be constructed using the communication parameters transferred in the communication parameter transfer step 405.

Next, each of the six steps composing the abovementioned communication parameter configuration sequence will be described in detail.

The description will begin with the communication parameter configuration network formation step 401, carried out between the digital camera 100 and the printer 101. First, the communication parameter configuration activation button 215 of the digital camera 100 (apparatus A) and the parameter configuration activation button 315 of the printer 101 (apparatus B) are pressed. When the buttons 215 and 315 are pressed, the digital camera 100 and the printer 101 form a communication parameter configuration ad hoc network. This network is formed using configuration communication parameters stored in the RAMs 204 and 304.

All processing performed in each of the steps, as described below, are carried out by communicating over the network formed in step 401.

Next, a detailed description will be provided on the master device determination step 402 performed between the digital camera 100 and the printer 101.

First, a message format transmitted and received between the devices A and B in the master device determination step 402 will be explained using FIG. 5.

Figure 5:
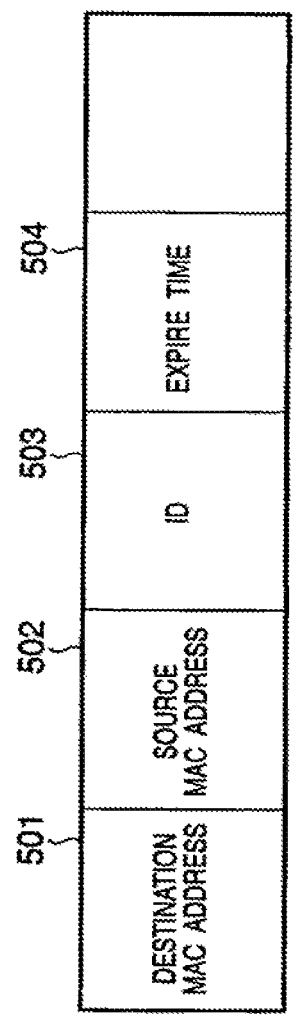
FIG. 5 is a diagram showing a format of a message transmitted and received between devices A and B.

As shown in FIG. 5, messages transmitted and received between the various devices in the master device determination step 402 include at least the following information: address information indicating source and destination of transmission (destination MAC address 501, source MAC address 502), ID information 503 indicating an identifier (ID) for the communication parameter configuration control function, and expire time information indicating expire times for each device during the master device determination step 402. Incidentally, an expire time information value of "0" indicates that the device receiving the message will immediately detach itself from the network.

Next, with reference to FIGS. 6A, 6B and 6C, the procedure of the master device/slave device determination processing performed by each device upon joining the network will be described.

Figure 6A:
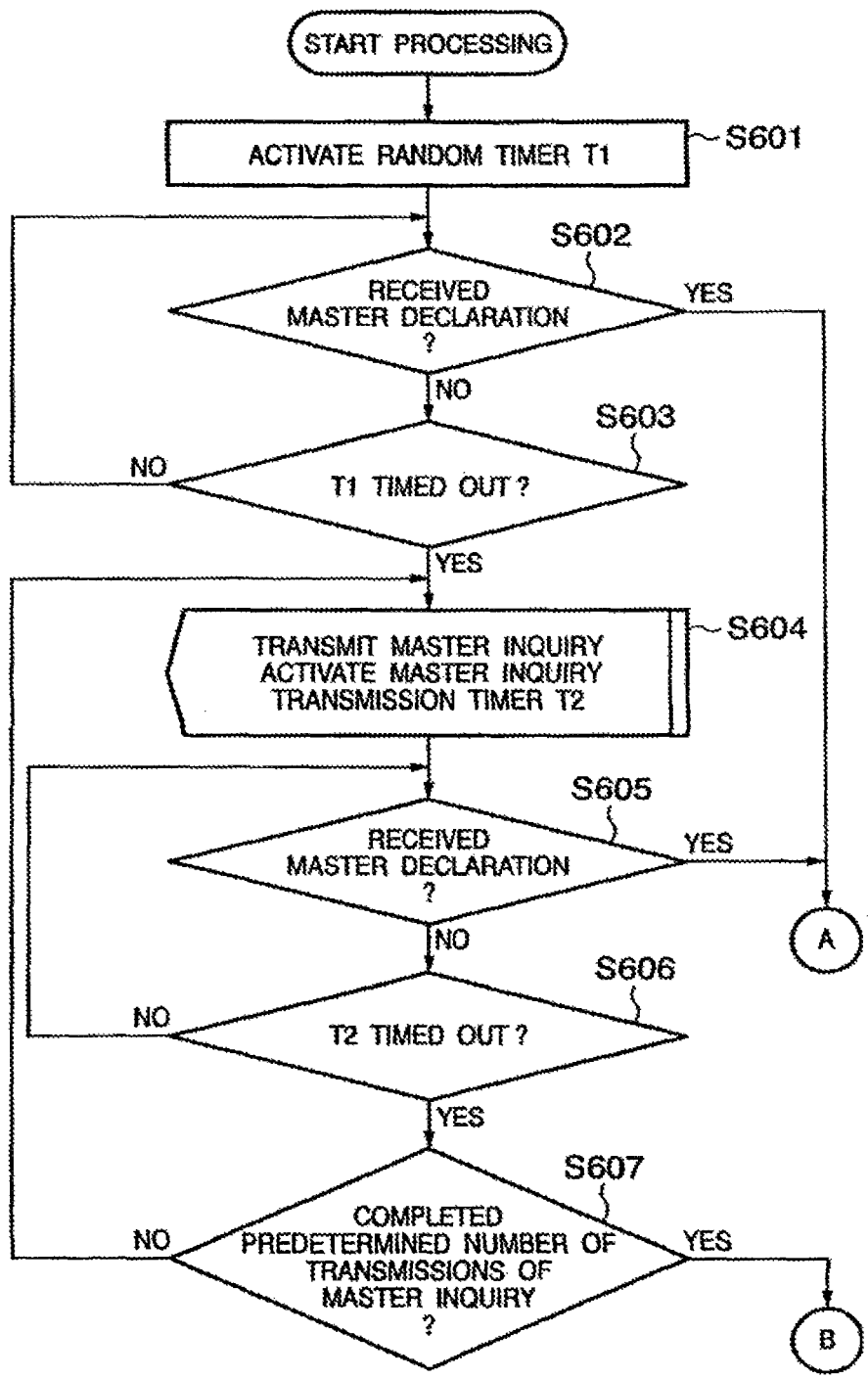
FIGS. 6A, 6B and 6C are flowcharts showing master device/slave device determination processing performed by each device upon joining a network.
Figure 6B:
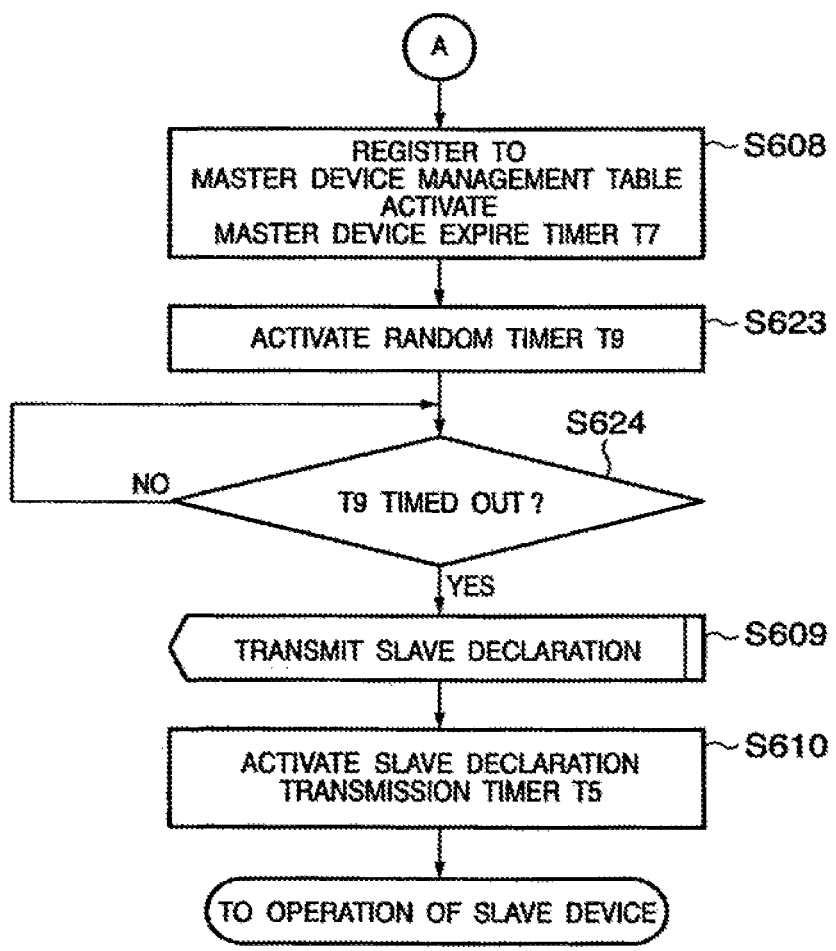
Figure 6C:
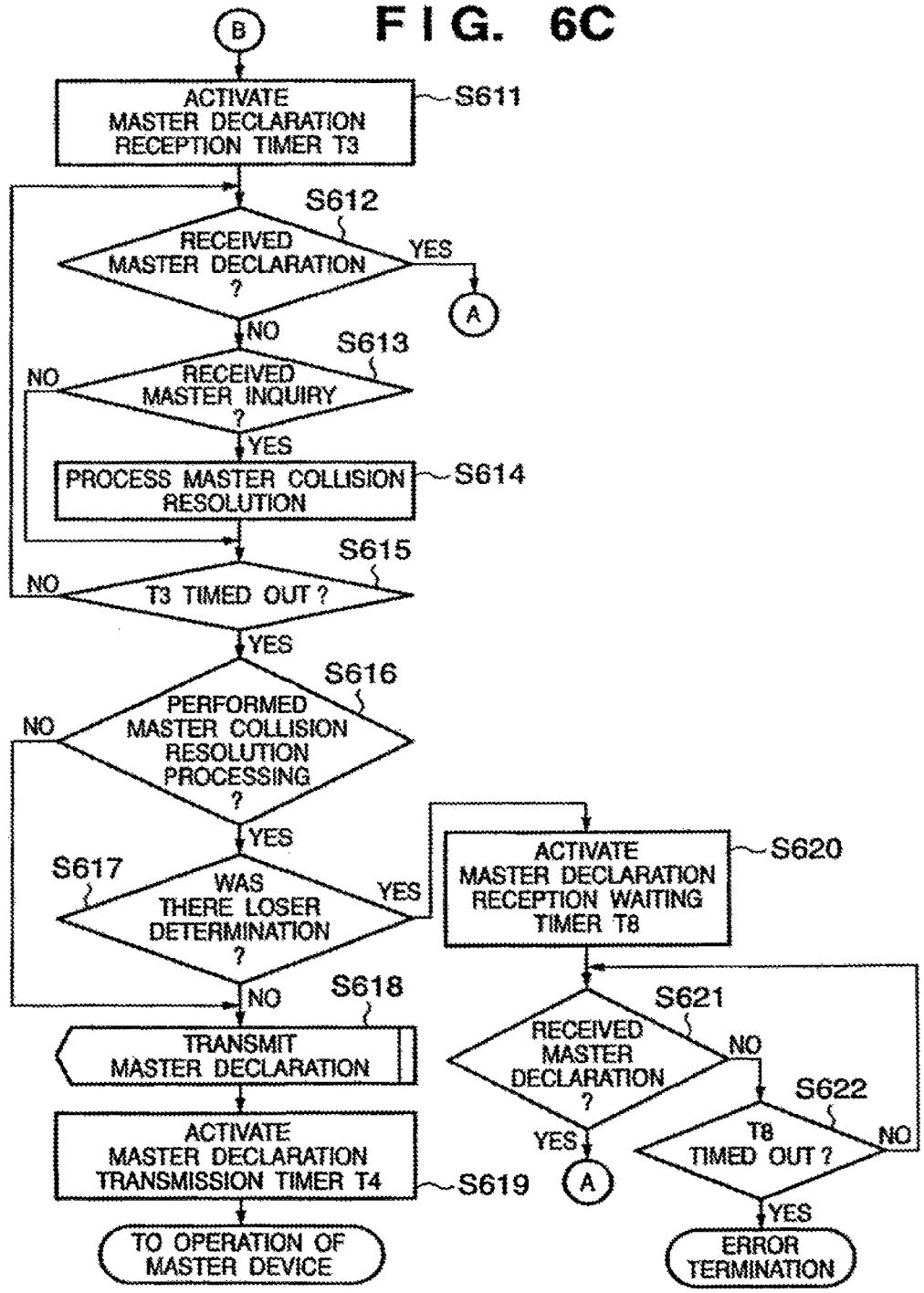

FIGS. 6A, 6B and 6C are flowcharts showing master device/slave device determination processing performed by each device upon joining the network.

After the master device determination step 402 is commenced, the process proceeds to step S601 where the device activates a random timer T1. The timer T1 makes it possible to avoid message collisions that occur when messages are concurrently transmitted from a plurality of devices simultaneously initiating the master device determination step 402 by delaying the transmission of an inquiry message, performed during subsequent processing, by a random amount of time.

In step S602, the device verifies reception of a master declaration message that notifies the existence of a master device. If a master declaration message is received, it is determined that a master device already exists within the network, and the process proceeds to step S608 described later. If a master declaration message is not received, the device proceeds to step S603 to verify timeout of the timer T1. When the timer T1 has not yet timed out, the device returns to step S602, and repeats the abovementioned processing until either a master declaration message is received, or the timer T1 times out. This processing enables prompt processing upon master declaration reception, described in step S608, even when receiving the master declaration message during a random waiting time for the purpose of avoiding message collision.

When the timer T1 times out in step S603, the process proceeds to step S604 during which the device broadcasts a master inquiry message that inquires about the existence of a master device, thereby activating master inquiry transmission timer T2. The master inquiry transmission timer T2 is used for transmitting a master inquiry message at regular intervals.

Next, in step S605, the device verifies reception of the master declaration message. When the master declaration message is received, the device acknowledges that a master device already exists in the network, and proceeds to step S608 described later. If the master declaration message is not yet received, the device proceeds to step S606 to verify timeout of the timer T2. When the timer T2 has not yet timed out, the process returns to step S605, and repeats the abovementioned processing until either a master declaration message is received, or the timer T2 times out.

In addition, when the timer T2 has timed out in step S606, the process proceeds to step S607 in which the device verifies whether the master inquiry message has been transmitted a predetermined number of times. If not, the process returns to step S604 and repeats the processing of steps S604 to S607 until either the master inquiry message has been transmitted a predetermined number of times or the master declaration message is received.

Meanwhile, when the device has received the master declaration message, the process proceeds to step S608 in which a MAC address 501 of the master device is acquired from the received message. The acquired MAC address is registered in a master device management table (see FIG. 19) stored in the RAM. In addition, the expire time of the master device is acquired from the received expire time information 504. A master device expire timer T7 is set to the acquired expire time and is activated. The timer T7 is used to verify the time that the master device exists on the network. When the timer T7 times out, the device determines that the master device has detached from the network.

After activating the timer T7 in step S608, the device activates a random timer T9 in step S623. The timer T9 delays the transmission of a slave declaration message, performed during subsequent processing, by a random amount of time. This makes it possible to avoid message collisions that occur when slave declaration messages are concurrently transmitted from a plurality of devices in response to a master declaration message. After activating the timer T9, the process proceeds to step S624 to wait for the timer T9 to time out.

When the timer T9 eventually times out, the device proceeds to step S609 in which it transmits a slave declaration message, which notifies that the device is a slave device, to the master device. Next, in step S610, the device activates a slave declaration message transmission timer T5. The timer T5 is used for periodic transmission of the slave declaration message, and the slave declaration message is retransmitted upon timeout of the timer T5. The timer T5 is set to a value that is shorter than the expire time described in the slave declaration message, enabling the timer T5 to periodically transmit the message while avoiding expiration.

After activating the timer T5, the device performs operation as a slave device described later.

When the master inquiry message is transmitted a predetermined number of times in the abovementioned step S607, the process proceeds to step S611 in which the device activates a master declaration message reception timer T3. The device waits for reception of a message from another device until the timer T3 times out. When a message is received, the device performs processing as described below according to the message type.

In step S612, the device verifies reception of the master declaration message. When the master declaration message has been received, the process acknowledges that a master device already exists in the network and proceeds to step S608. When the message has not yet been received, the process proceeds to step S613.

In step S613, the device verifies reception of a master inquiry message. When a master inquiry message has been received, the device determines that a state of master inquiry collision exists, where a master device does not exist while devices other than the device itself that are capable of becoming the master device exist in the network. The process proceeds to step S614 to perform master collision resolution. Meanwhile, when a master inquiry message has not been received, the process proceeds to step S615.

In step S614, the device performs master collision resolution processing to resolve the state of master inquiry collision. This involves comparing the transmission source MAC address 502 of the received master inquiry message to the MAC address of the device in question in lexicographic order. When the comparison reveals that the MAC address of the device is smaller in lexicographic order, the device is determined to be a winner. On the other hand, when the comparison reveals that the MAC address of the device is larger in lexicographic order, the device is determined to be a loser. Determination results are stored to be used in the processing of step S617 to be described in detail later.

Meanwhile, when three or more devices are performing the processing of the master device determination step 402, it is conceivable that each device performs the master collision resolution processing described in step 614 with a plurality of devices until the master declaration reception timer T3 times out. In this case, a loser determination will be stored as the determination result even when determined a loser only once. A winner determination will be stored as the determination result only when a device is determined to be a winner in all master collision resolution processing.

Next, in step S615, the device verifies timeout of the master declaration reception timer T3. When the timer T3 has timed out, the device determines that no master devices exist in the network, and the process proceeds to step S616. When the timer T3 has not timed out, the process returns to step S612.

In step S616, the device verifies whether master collision resolution processing has been performed by the time the master declaration reception timer T3 times out. If master collision resolution processing has been performed, the process proceeds to step S617, otherwise the process proceeds to step S618.

In step S617, the device verifies the determination results of the master collision resolution processing. If the determination resulted in a winner determination, the process proceeds to step S618. If the determination resulted in a loser determination, the process proceeds to step S620.

In step S618, the device broadcasts a master declaration message that notifies that the device itself is a master device to the network.

In step S619, the device activates a master declaration message transmission timer T4. The timer T4 is used to periodically transmit the master declaration message, and retransmits the master declaration message upon timeout. The timer T4 is set to a value that is shorter than the expire time described in the master declaration message, enabling the timer T4 to periodically transmit the message while avoiding expiration. After activating the timer T4, the device performs operation as a master device described later.

In step S620, the device activates a master declaration reception waiting timer T8. The timer T8 is used by the device that was determined to be the loser in the above described determination of step S617 to wait for a certain period for the reception of the master declaration message from the device that was determined to be the winner.

In step S621, the device verifies reception of the master declaration message. If the master declaration message was received, the process proceeds to step S608 described above. If the master declaration message was not received, the process proceeds to step S622. In step S622, the device verifies timeout of the master declaration reception waiting timer T8. If the timer T8 has timed out, the device performs error termination since it was unable to receive a message from the master device within the allotted time. On the other hand, if the timer T8 has not timed out, the process returns to step S621.

Incidentally, while an error termination is performed when the timer T8 is timed out in step S622, the process may be configured to return to step S601 to retransmit the master inquiry message when the timer T8 times out. This processing enables prompt retrying of the processing of master and slave device determination even when the device was unable to receive a message from the master device within the allotted time.

In addition, in the processing of master and slave device determination shown in FIGS. 6A, 6B and 6C, when a master inquiry message is received from another device before the transmission of a master inquiry message of step S604 is completed, the master collision resolution processing of step S614 is performed. If the master collision resolution processing results in a determination of loser, subsequent transmission of a master inquiry message is not necessary. This makes it possible to suppress transmission of unnecessary messages to the network.

The processing of master and slave device determination is performed according to the above procedures.

Next, with reference to FIGS. 7 to 12, the operation of a master device during the master device determination step 402 will be explained.

The master device performs processing described below according to various conditions when either receiving a message from another device on the network or when a timer within the master device times out.

First, processing for master inquiry message response, performed when the master device receives a master inquiry message from another device on the network, will be explained.

Figure 7:
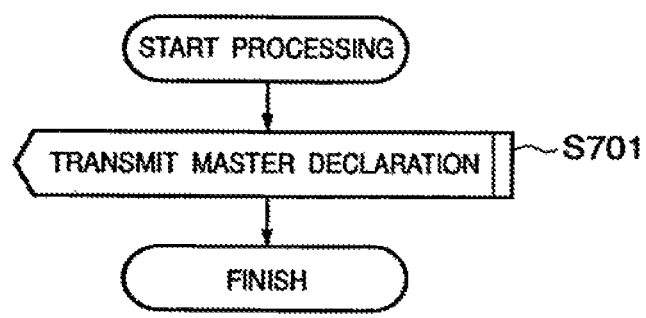
FIG. 7 is a flowchart showing response processing to a master inquiry message.

FIG. 7 is a flowchart showing response processing to a master inquiry message. After initiating processing, in step S701, the master device transmits a master declaration message to the device that is the transmission source of the master inquiry message. After transmitting the message, the master device terminates master inquiry message response processing.

In step S701, when transmitting a master declaration message as a response to a master inquiry message, a method where the master declaration message is broadcasted can be considered as an alternative to performing a unicast transmission to the source device of the message. While an advantage of the latter method is that economic message transmission is achieved, the former method is capable of transmitting a master declaration message to a plurality of devices at the same time, and thereby has an advantage where the master declaration message can be efficiently transmitted when a plurality of devices are in a state of master inquiry. Thus, the two methods have different advantages. The present invention does not limit the method to be used to transmit a master declaration message in response to a master inquiry message, and allows either method to be used.

Next, processing for master declaration message regular transmission performed by the master device upon timeout of the master declaration message transmission timer T4, which is activated either in the abovementioned step S619 or step S802 described later, will be explained.

Figure 8:
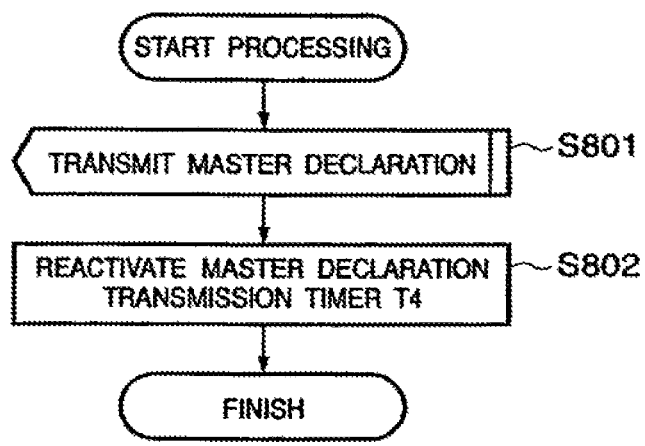
FIG. 8 is a flowchart showing processing of master declaration message regular transmission.

FIG. 8 is a flowchart showing processing of master declaration message regular transmission. After initiating processing, in step S801, the master device broadcasts a master declaration message to the network. After broadcasting the message, in step S802, the master device configures the master declaration message transmission timer T4 to a value that is shorter than the expire time of the master device, and restarts the timer T4. After restarting the timer, the master device terminates processing of master declaration message regular transmission.

Next, processing for slave device management performed by the master device upon receiving a slave declaration message will be explained.

Figure 9:
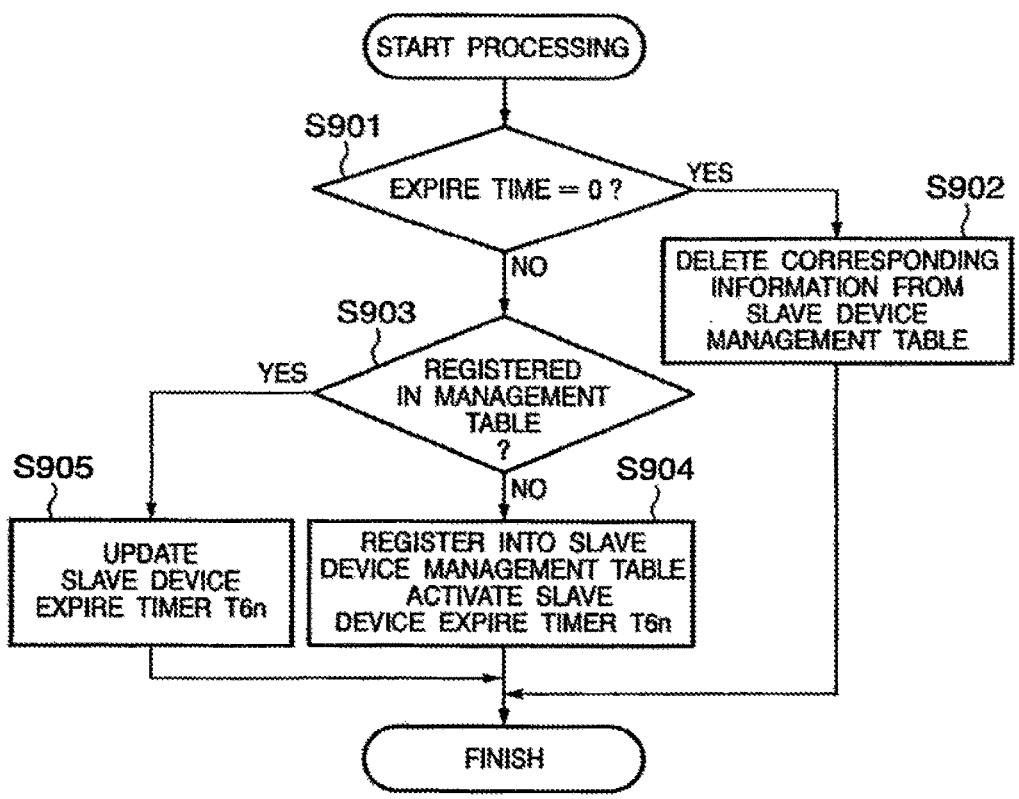
FIG. 9 is a flowchart showing slave device management processing.

FIG. 9 is a flowchart showing slave device management processing. After initiating processing, in step S901, the master device references the value described in the expire time information 504 of the slave declaration message to verify whether the value is "0". If the value of the expire time is "0", the master device determines that the slave device transmitting the slave declaration message will detach from the network, and the process proceeds to step S902. If the value of the expire time is not "0", the process proceeds to step S903.

In step S903, the master device verifies whether the source MAC address 502 of the received slave declaration message is registered in the slave device management table (see FIG. 10) stored in the RAM. The slave device management table shown in FIG. 10 is a table for registering MAC addresses of slave devices according to index numbers for a master device to acquire information on slave devices currently participating in the network.

If the source MAC address is not registered in the table, the master device determines that the slave device that transmitted the slave declaration message has joined the network, and the process proceeds to step S904. If the source MAC address is registered in the table, the process proceeds to step S905 where the master device performs updating of the expire time of the slave device.

In step S904, the master device registers the source MAC address 502 of the received slave declaration message into the slave device management table. The master device sets a slave device expire timer T6n, which corresponds to an index number n for the registered slave device in the table, to the expire time referenced in the abovementioned step S901, and activates the timer. One timer T6 is activated for each slave device registered in the slave device management table. When the timer T6n times out, the master device determines that the corresponding slave device has detached from the network.

In step S905, the master device updates the timer value of the slave device expire timer T6n, which corresponds to the slave device that transmitted the slave device declaration message, to the expire time referenced in the abovementioned step S901, and restarts the timer.

Meanwhile, in step S902, the master device deletes the MAC address of the slave device of the index number n, which corresponds to the slave device that transmitted the slave device declaration message, from the slave device management table.

Slave device management by the master device is performed according to the above procedures.

Processing upon slave device detachment, performed by the master device upon timeout of the slave device expire timer T6n that is activated either in the abovementioned step S904 or step S905, will now be explained.

Figure 11:
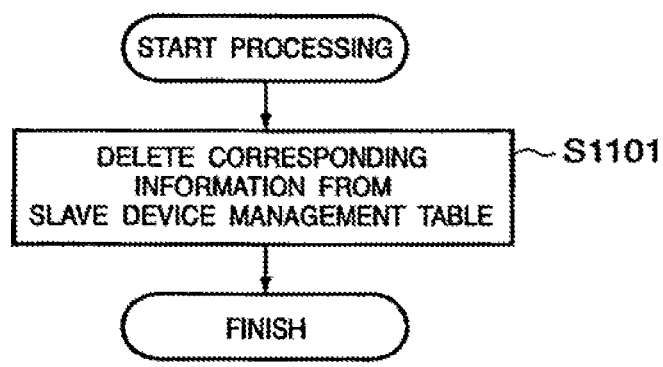
FIG. 11 is a flowchart showing processing upon detachment of a slave device.

FIG. 11 is a flowchart showing processing upon detachment of a slave device. After processing is initiated, in step S1101, the master device determines that the slave device corresponding to the timed out timer has detached the network. The master device deletes the MAC address of the slave device of the index number n, which corresponds to the timer that has timed out, from the slave device management table. After deletion, the master device terminates the slave device detachment processing.

Next, master device termination processing, performed by the master device as a normal termination of its operations as a master device in response to user operations or instructions from upper layer applications and the like, will be explained.

Figure 12:
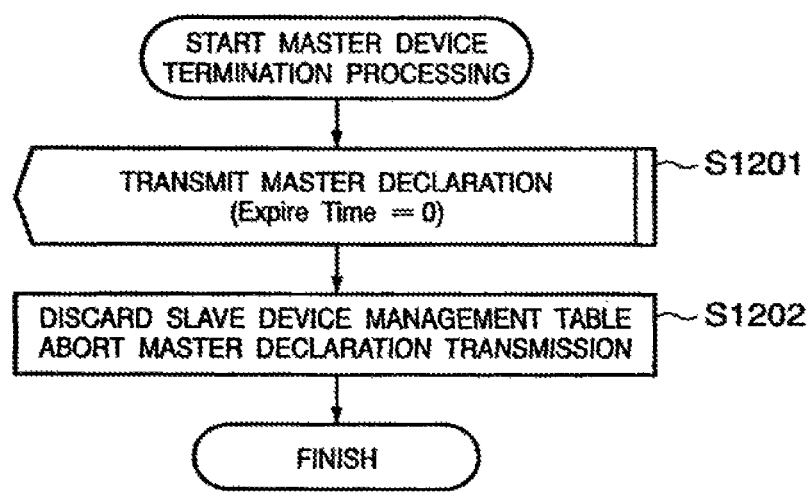
FIG. 12 is a flowchart showing processing upon termination of a master device.

FIG. 12 is a flowchart showing a process upon termination of a master device. After initiating processing, in step S1201, the master device broadcasts a master declaration message with a value of "0" in its expire time information 504. This message broadcast serves to notify the slave device that the master device is about to detach. After transmitting the message, in step S1202, slave device expire timers T6 are terminated. In addition, regular transmission of the master declaration message is completed by discarding the slave device management table and terminating the master declaration message transmission timer T4. The operations of the master device are thereby completed.

Operation of the master device in the master device determination step 402 is performed according to the procedures described above.

As explained thus far, in the first embodiment, device joining a network transmit master inquiry messages (step S604), and verify reception of master declaration messages (step S605). Meanwhile, a master device transmits master declaration messages immediately upon receiving master inquiry messages (step S701).

When a master device exists on the network, this makes it possible to detect a master device more promptly than by using a method where devices participating in a network regularly transmit messages after verifying reception of messages.

In addition, device management processing using the abovementioned time expire information 504 enables devices to detect the detachment of devices by receiving messages where the expire times are set to "0", which allows the devices to understand the statuses of devices more promptly than in the case where verification is performed at regular intervals.

Next, with reference to FIGS. 13 to 16, the operation of a slave device during the master device determination step 402 will be explained.

The slave device performs processing described below according to various conditions when either receiving a message from the master device or when a timer within the slave device times out.

First, processing for slave declaration message regular transmission, which is performed by the slave device upon timeout of the slave declaration message transmission timer T5 activated either in the abovementioned step S610 or step S1302 described below, will be explained.

Figure 13:
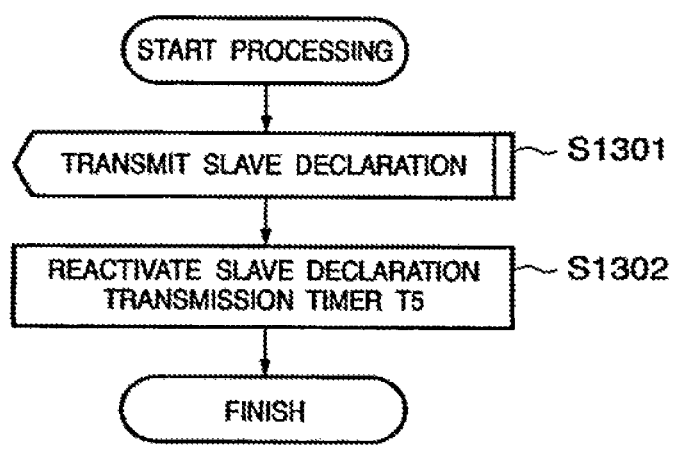
FIG. 13 is a flowchart showing slave declaration message regular transmission processing.

FIG. 13 is a flowchart showing slave declaration message regular transmission processing. After initiating processing, in step S1301, the slave device transmits a slave declaration message to the master device. After transmitting the message, in step S1302, the slave device sets the slave declaration message transmission timer T5 to a value that is shorter than the expire time of the slave device, and restarts the timer. After restarting the timer, the slave device terminates processing for slave declaration message regular transmission.

Next, processing for slave device management performed by the slave device upon receiving a master declaration message will be explained.

Figure 14:
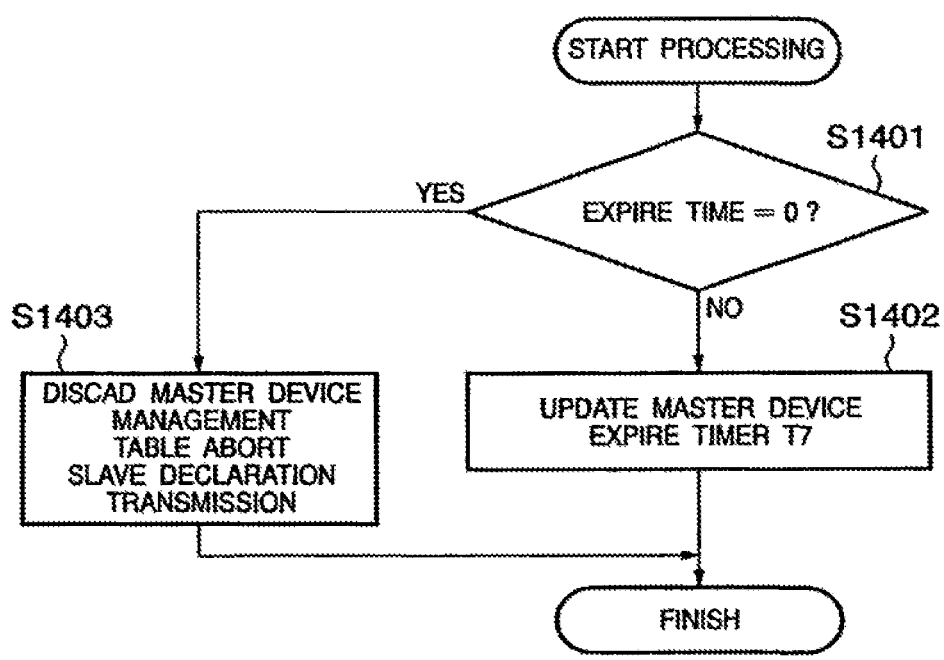
FIG. 14 is a flowchart showing master device management processing.

FIG. 14 is a flowchart showing master device management processing. After initiating processing, in step S1401, the slave device references the value described in the expire time information 504 in the master declaration message to verify whether the value of the expire time is "0". If so, the slave device determines that the master device will detach from the network and proceeds to step S1403. If not, the process proceeds to step S1402.

In step S1402, the slave device updates the timer value of the master device expire timer T7 to the expire time referenced in the abovementioned step S1401, and restarts the timer.

In step S1403, the slave device terminates the master device expire timer T7 and discards the master device management table. By terminating the slave declaration message transmission timer T5, the slave device terminates regular transmission of the slave declaration message, thereby terminating its operations as a slave device.

Master device management processing is performed according to the above procedures.

Next, processing upon master device detachment, performed by the slave device upon timeout of the master device expire timer T7 that was activated either in the abovementioned step S608 or step S1402, will be explained.

Figure 15:
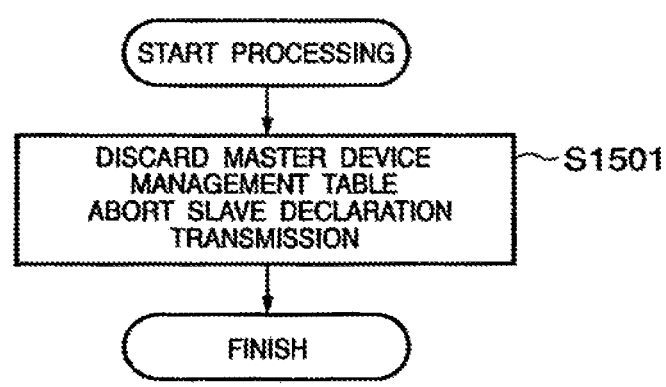
FIG. 15 is a flowchart showing processing upon detachment of a master device.

FIG. 15 is a flowchart showing processing upon detachment of a master device. After processing is initiated, in step S1501, the slave device terminates the master device expire timer T7 and discards the master device management table. By terminating the slave declaration message transmission timer T5, the slave device terminates regular transmission of the slave declaration message, thereby terminating its operations as a slave device.

Next, slave device termination processing, performed by the slave device as a normal termination of its operations as a slave device in response to user operations or instructions from upper layer applications and the like, will be explained.

Figure 16:
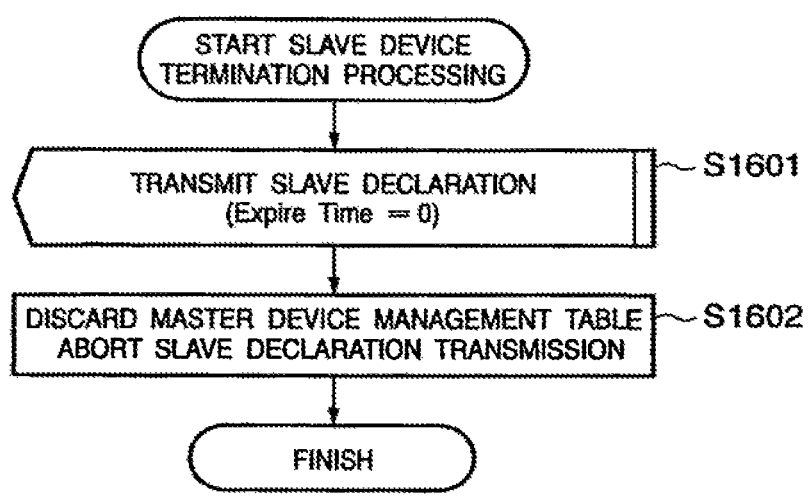
FIG. 16 is a flowchart showing processing upon termination of a slave device.

FIG. 16 is a flowchart showing processing upon termination of a slave device. After initiating processing, in step S1601, the slave device transmits a slave declaration message with a value of "0" in its expire time information 504. The message transmission serves to notify the master device that the slave device is about to detach. After transmitting the message, in step S1602, the master device expire timer T7 is terminated, and the master device management table is discarded. In addition, by terminating the slave declaration message transmission timer T5, the slave device terminates regular transmission of the slave declaration message, thereby terminating its operation as a slave device.

Incidentally, the abovementioned steps S1403 and S1501 may be configured so that the device retries the master device/slave device determination processing shown in FIGS. 6A, 6B and 6C after terminating operations as a slave device. For instance, even in the case where a master device terminates while performing wireless parameter auto-configuration between three or more devices, this makes it possible for the remaining devices to promptly recommence the master device determination step 402 to continue processing for wireless parameter auto-configuration.

Operations for a slave device in the master device determination step 402 are performed according to the above procedures.

Next operations of the digital camera 100 (device A) and the printer 101 (device B), shown in FIG. 1, when performing master device determination during the master device determination step 402 described using FIGS. 5 to 16, will be explained in detail using FIGS. 17 and 18.

First, operations will be explained for a case where a master device does not exist within the network, the device B initiates processing after the device A initiates processing, and master and slave device are determined between the two devices.

Figure 17:
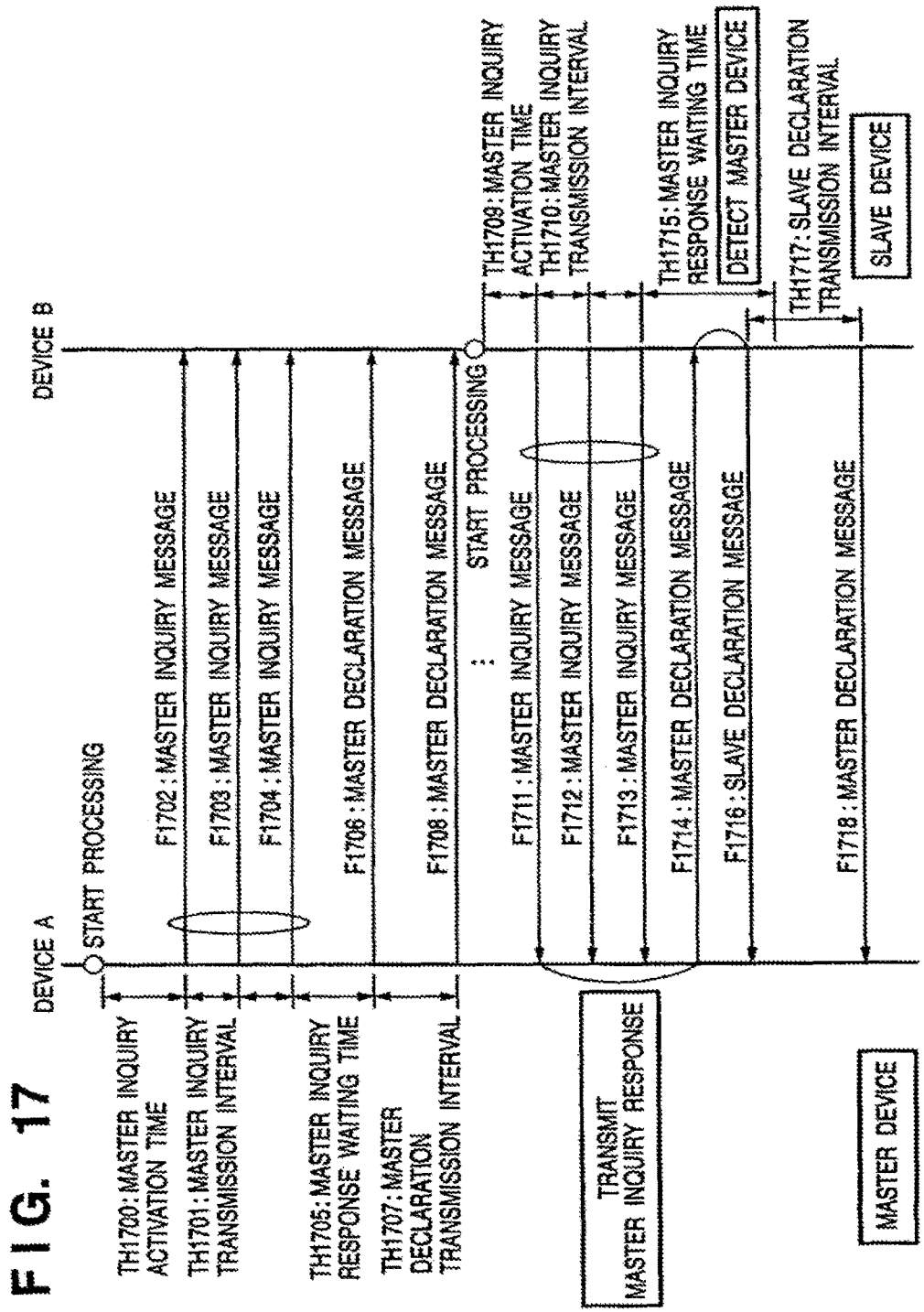
FIG. 17 is a diagram showing a sequence for determining a master device and a slave device when the device B commences processing after the device A commences processing.

FIG. 17 is a diagram showing a sequence for determining a master device and a slave device when the device B initiates processing after the device A initiates processing.

After the device A initiates processing, the random timer T1 is activated over a master inquiry activation time (TH1700) to wait for message transmission (comparable to steps S601, S602 and S603). As explained above for step S601, this is performed to avoid message collisions that occur when messages are concurrently transmitted from a plurality of devices initiating the master device determination step 402 at the same time.

Afterwards, as the random timer T1 times out, the device A sets the master inquiry transmission timer T2 to a master inquiry transmission interval (TH1701) and activates the timer. The device A transmits a master inquiry message upon each timeout of the master inquiry transmission timer T2 (comparable to steps S604, S605, S606 and S607). In this example, the master inquiry message is transmitted three times (F1702, F1703 and F1704).

After transmitting the master inquiry message, the device A activates the master declaration reception timer T3, and waits for a master inquiry response waiting time (TH1705) to receive a master declaration message (comparable to steps S611, S612, S613 and S615). In this example, the device A does not receive the message within the predetermined amount of time (TH1705). Therefore, after the timeout of the master declaration reception timer T3, the device A broadcasts (F1706) a master declaration message to notify other devices that the device A is the master device (comparable to steps S616 and S618).

After transmitting the master declaration message, the device A sets the master declaration transmission timer T4 to a master declaration transmission interval (TH1707) and activates the timer. The device A periodically broadcasts (F1708) the master declaration message every time the master declaration transmission timer T4 times out (comparable to steps S619, S801 and S802).

In the example shown in FIG. 17, processing of device B commences after regular transmission of the master declaration message is initiated (between F1706 and F1708) by the device A.

After the device B initiates processing, the random timer T1 is activated over a master inquiry activation time (TH1709) to wait for message transmission. After the random timer T1 times out, the device B sets the master inquiry transmission timer T2 to a master inquiry transmission interval (TH1710) and activates the timer. The device B transmits a master inquiry message three times (F1711, F1712 and F1713) upon each timeout of the master inquiry transmission timer T2.

This allows the device A to respond to the master inquiry message (F1711) from the device B to transmit a master declaration message to the device B (F1714) (comparable to the processing of step S701). After transmitting the master inquiry message, the device B activates the master declaration reception timer, and waits for the transmission of a master declaration message for a master inquiry response waiting time (TH1715).

In the example shown in FIG. 17, the device B detects that the device A is the master device by receiving a master declaration message from the device A during a predetermined time (TH1715). The device B registers the MAC address of the device A into the master device management table (FIG. 19), and sets the master device expire timer T7 to the expire time of the device A acquired from the master declaration message and activates the timer. In addition, the device B transmits a slave declaration message (F1716) to the device A (comparable to steps S608 and S609).

Meanwhile, when receiving the slave declaration message of device B, the device A registers the MAC address of the device B into the slave device management table (FIG. 10). The device B also sets the slave device expire timer T6 to the expire time of the device B acquired from the slave declaration message and activates the timer (comparable to steps S901, S903 and S904).

After transmitting the slave declaration message, the device B sets the slave declaration transmission timer T5 to a slave declaration transmission interval (TH1717) and activates the timer. The device B periodically transmits (F1718) the slave declaration message to the device A every time the slave declaration transmission timer T5 times out (comparable to steps S610, S1301 and S1302).

Subsequently, the devices A and B periodically transmit declaration messages according to the declaration transmission timers, and when declaration messages are received, reset the expire timers to the expire times in the messages and restart the expire timers (comparable to steps S905 and S1402).

Master and slave devices are determined by the above procedures according to the sequence shown in FIG. 17.

Next, operations will be explained for a case where a master device does not exist within the network, the devices A and B initiate processing at substantially the same time, and master and slave devices are determined between the two devices.

In addition, this example assumes that the MAC address of the device A is smaller in lexicographic order than that of the device B, and that the device A will be determined to be the winner upon processing of master collision resolution.

Figure 18:
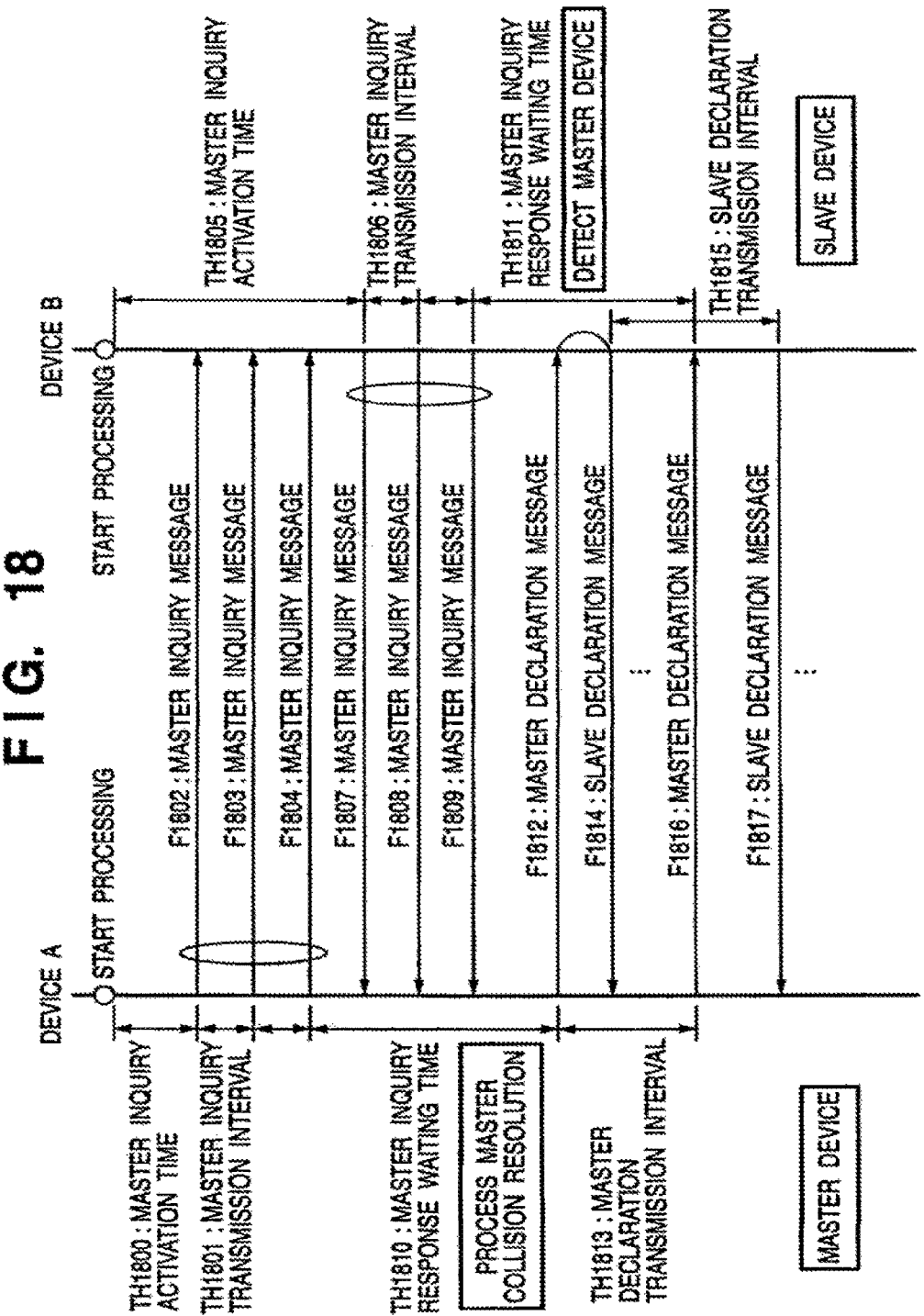
FIG. 18 is a diagram showing a sequence for determining a master device and a slave device when the devices A and B commence processing almost at the same time.

FIG. 18 is a diagram showing a sequence for determining a master device and a slave device when the devices A and B initiate processing almost at the same time.

After initiating processing, the device A activates the random timer T1 over a master inquiry activation time (TH1800) to wait for message transmission.

Afterwards, as the random timer T1 times out, the device A sets the master inquiry transmission timer T2 to a master inquiry transmission interval (TH1801) and activates the timer. The device A transmits a master inquiry message upon each timeout of the master inquiry transmission timer T2. In this example, the master inquiry message is transmitted three times (F1802, F1803 and F1804).

At the same time as the device A, after initiating processing, the device B activates the random timer T1 over a master inquiry activation time (TH1805) to wait for message transmission.

Afterwards, as the random timer T1 times out, the device B sets the master inquiry transmission timer T2 to a master inquiry transmission interval (TH1806) and activates the timer. The device B transmits a master inquiry message three times upon each timeout of the master inquiry transmission timer T2 (F1807, F1808 and F1809).

After transmitting the master inquiry message, the device A activates the master declaration reception timer T3, and waits to receive a message for a master inquiry response waiting time (TH1810). In this example, the device A performs master collision resolution processing since it receives a master inquiry message from the device B during a predetermined amount of time (TH1810) (S613 and S614). In this case, the device A will be determined as the winner by master collision resolution processing. Thus, after timeout of the master declaration reception timer T3, the device A acknowledges that it has been determined as the winner by master collision resolution processing (comparable to step S617). The device A notifies the device B that it is the master device by broadcasting a master declaration message (F1812).

After transmitting the master declaration message, the device A sets the master declaration transmission timer T4 to a master declaration transmission interval (TH1813) and activates the timer. The device A periodically broadcasts (F1816) the master declaration message every time the master declaration transmission timer T4 times out.

Meanwhile, after transmitting the master inquiry message, the device B also activates the master declaration reception timer T3, and waits to receive a message for a master inquiry response waiting time (TH1811). In this example, the device B detects that the device A is the master device since it receives the master declaration message from the device A during the predetermined time (TH1811).

Figure 19:
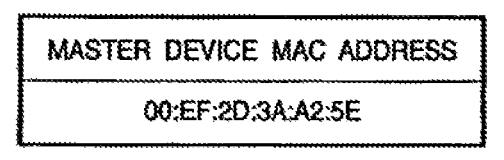

The device B registers the MAC address of the device A into the master device management table (FIG. 19). The device B also sets the master device expire timer T7 to the expire time of the device A acquired from the master declaration message and activates the timer, and transmits (F1814) a slave declaration message to the device A.

When the device A receives the slave declaration message from device B, the device A registers the MAC address of the device B into the slave device management table (FIG. 10). The device A also sets the slave device expire timer T6 to the expire time of the device B acquired from the slave declaration message and activates the timer.

After transmitting the slave declaration message, the device B sets the slave declaration transmission timer T5 to a slave declaration transmission interval (TH1815) and activates the timer. The device B periodically transmits (F1817) the slave declaration message every time the slave declaration transmission timer T5 times out.

Subsequently, the device A and B periodically transmit declaration messages according to the declaration transmission timers, and when declaration messages are received, reset the expire timers to expire times in the messages and restart the expire timers.

Master and slave device are determined by the above procedures according to the sequence shown in FIG. 18.

Next, the device capability information collection step where the master device determined by the abovementioned master device determination step 402 collects device capability information from slave devices participating in the same network will be explained.

Figure 20:
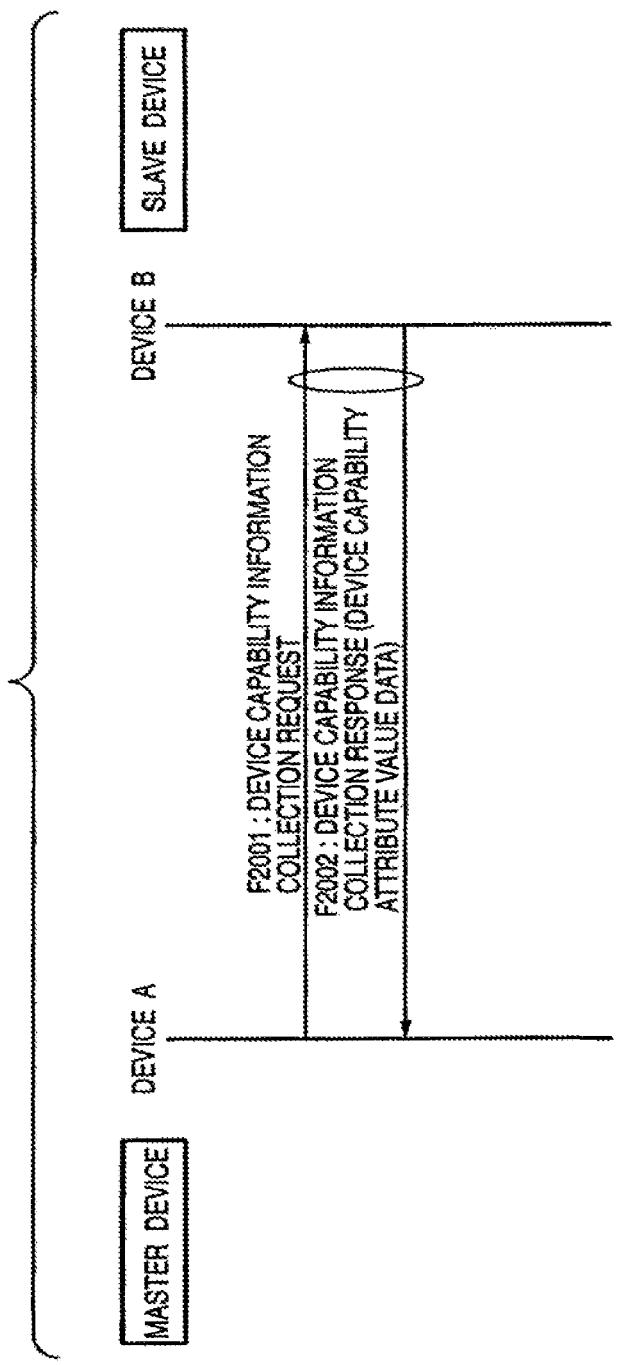
FIG. 20 is a diagram showing a sequence of collection of information on device capability by a master device, the digital camera 100 (device A), from a slave device, the printer 101 (device B)

FIG. 20 is a diagram showing a sequence of collection of information on device capability by a master device, the digital camera 100 (device A), from a slave device, the printer 101 (device B). A detailed description will be provided below.

First, the digital camera 100, which is the master device, performs a device capability information collection request towards the printer 101 (F2001). The printer 101, which is the slave device, responds to this request by returning a device capability information collection response that includes its own device capability attribute value data to the source of request, the digital camera 100 (F2002). In this case, the master device activates a device capability information collection step timer TCM100, and performs the above described device capability information collection on slave devices currently considered to exist.

Figure 24:
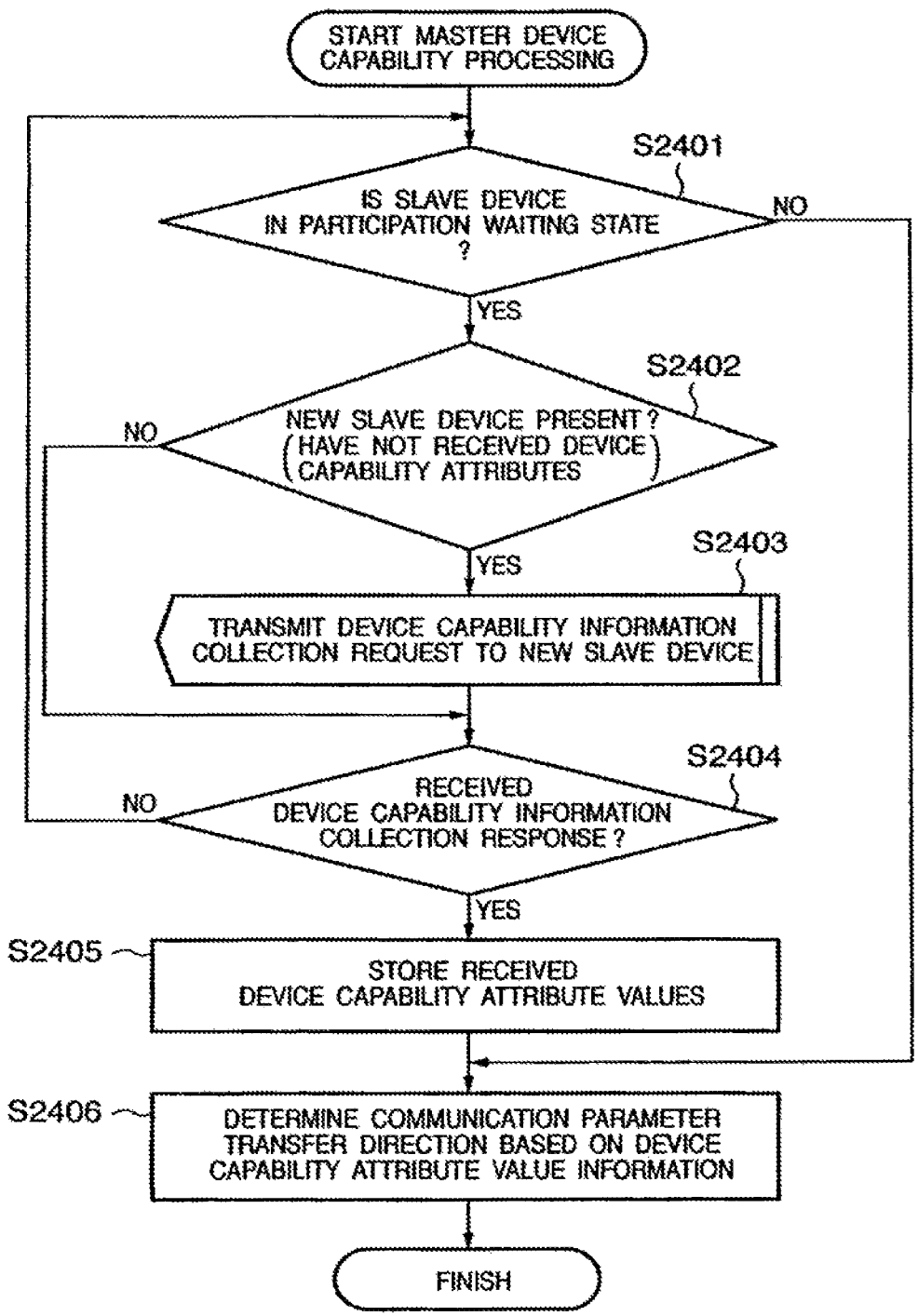
FIG. 24 is a flowchart showing processing performed by a master device corresponding to automatic communication parameter configuration during a device capability information collection step that includes determination processing.

FIG. 24 is a flowchart showing processing performed by the master device that corresponds to automatic communication parameter configuration during a device capability information collection step that includes determination processing. A detailed description will be provided below.

The master device checks whether the current state is a slave device participation acceptance state (S2401). If the participation acceptance state has already been closed, collection of the device capability attribute values of devices already participating in the network has been completed. Thus, the process proceeds to the next step, which is the communication parameter transfer direction determination step 404 (S2406).

On the other hand, if still in an acceptance state, the master device checks whether there are new slave devices (slave devices for which device capability attributes have not yet been collected) (S2402). If such a device exists, the master device transmits a device capability information collection request towards the new slave device (S2403). Upon receiving a device capability information collection response from the slave device (S2404), the master device stores the received device capability attribute values (S2405).

Figure 37:
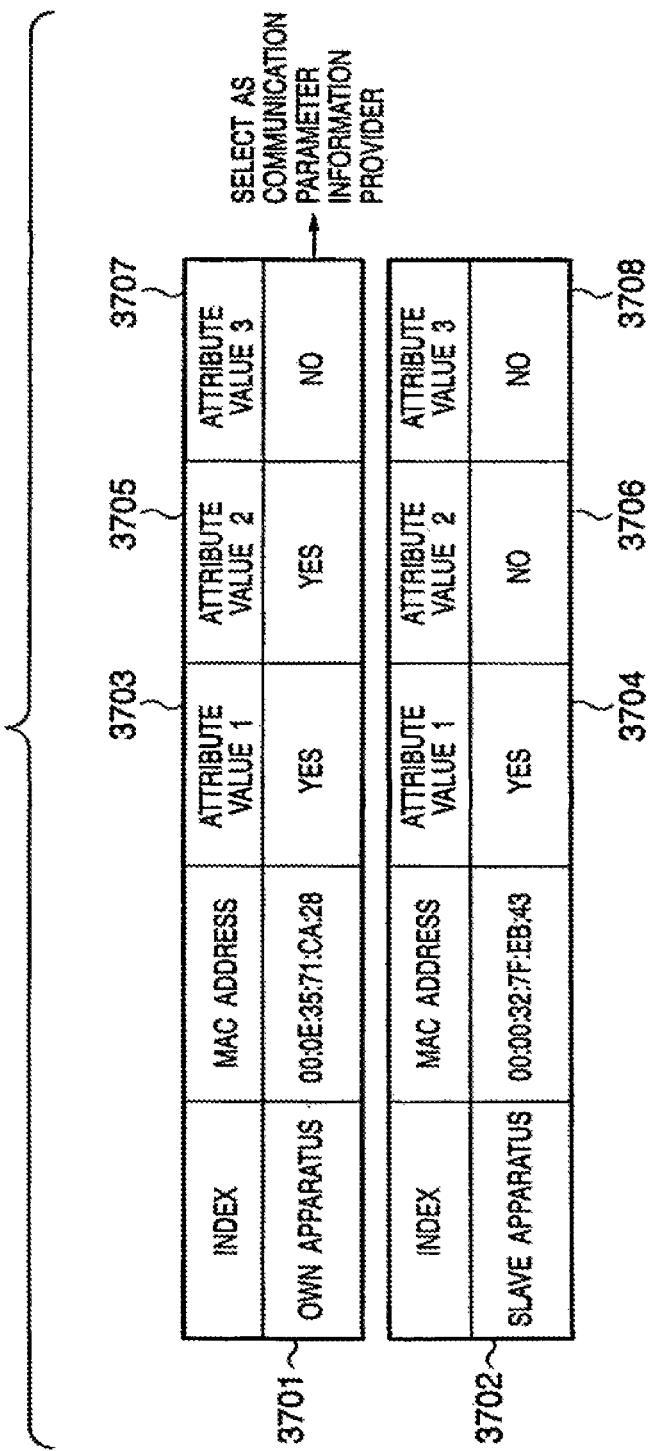
FIG. 37 is a diagram showing an example of a configuration of a memory that stores device capability attribute values.

FIG. 37 is a diagram showing an example of a configuration of a memory that stores device capability attribute values. As shown in FIG. 37, the master device stores a table 3701 of its own attribute values, as well as a list 3702 of attribute values received from the new slave device. In the example shown in FIG. 37, these are composed of lists containing MAC addresses to identify the devices and a plurality of attribute values (attribute values 1, 2 and 3).

Based on the stored device capability attribute value information, the transfer direction of the communication parameters will now be determined (S2406). In the example shown in FIG. 37, the master device and the slave device both have the same value "YES" for attribute value 1. However, for attribute value 2, the master device has a value of "YES", while the slave device has a value of "NO". Therefore, the master device chooses itself as the communication parameter information provider.

As seen, the master device is constantly capable of detecting slave devices while concurrently performing, as an independent process, collection of device capability attribute values from the slave devices. Therefore, it is possible of reducing the time required for processing as compared to a case when device capability attribute values of the slave devices are collected after closing the participation acceptance state.

Figure 22:
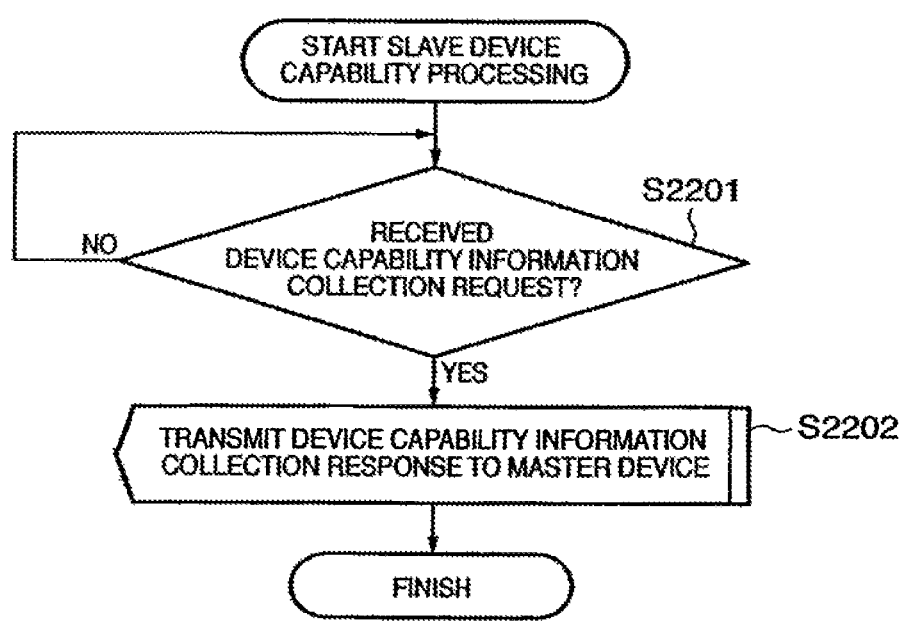
FIG. 22 is a flowchart showing processing performed by a slave device corresponding to automatic communication parameter configuration during a device capability information collection step.

FIG. 22 is a flowchart showing processing performed by a slave device that corresponds to automatic communication parameter configuration during a device capability information collection step. A detailed description will be provided below.

When the device is a slave device, it receives a device capability information collection request from the master device (S2201). The slave device transmits a device capability information collection response including information indicating its own device capability to the master device (S2202).

Figure 36:
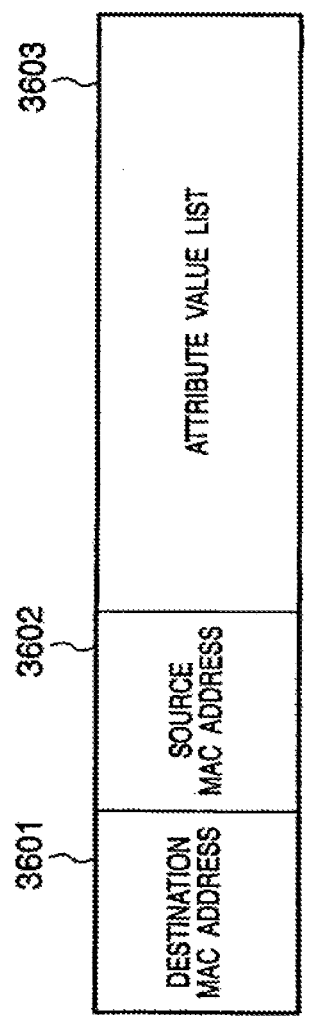
FIG. 36 is a flowchart showing a message format transmitted and received by a device corresponding to automatic communication parameter configuration during a device capability information collection step.

FIG. 36 is a flowchart showing a message format transmitted and received by a device that corresponds to automatic communication parameter configuration during a device capability information collection step. First, the master device inserts the MAC address of the slave device that is the destination of the device capability information collection request to a destination MAC address 3601. The master device also inserts its own MAC address to a source MAC address 3602, and generates a message including a list of its own attribute values. The master device inserts the list into an attribute list 3603.

Then, the slave device responds to the reception of the device capability information collection request command from the master device by inserting the MAC address of the master device to the destination MAC address 3601. The slave device also inserts its own MAC address to the source MAC address 3602, and as was the case with the master device, inserts its own device capability attribute values to the attribute list 3603, and transmits the message as a response to the master device.

As seen, by arranging both the request message of the master device and the response message from the slave device to include their own device capability attribute values, both devices are now capable of mutually understanding the device capability of the other device. In addition, when the slave device determines that the attribute value contained in the device capability information collection request message from the master device is not consistent with its own device capability attribute value, the slave device is capable of immediately terminating automatic communication parameter configuration instead of returning its device capability attribute value response. This enables prompt notification of the results of processing for automatic communication parameter configuration to the user.

Next, processing where the master device collects device capability attribute values from the slave device to determine the transfer direction of the communication parameters will be explained. A detailed description will be provided with reference to FIGS. 32 and 37.

FIG. 32 is a flowchart showing communication parameter transfer direction determination processing.

First, the digital camera 100, which is the master device, collects device capability attribute values of the printer 101, which is the slave device (S3201), and stores a device capability attribute value table in the RAM 204 in the format 3702 shown in FIG. 37 (S3202). The master device checks whether verification of all the attribute values of all the slave devices in the device capability attribute value table has been completed (S3203). If not, the master device extracts (screens and retains) all devices with "YES" as their current attribute values in the device capability attribute value table that stores the device capability attribute values of master and slave devices (S3204). Next, the master device checks whether the number of extracted devices (the number of devices screened and retained) is one or not (S3205).

If the number of extracted devices is not one, the master device advances the attribute value currently compared to the attribute value to be compared next (S3206), and repeats the above described processing (S3203). If verification of all attribute values has been completed and the number of extracted devices is one (S3207), the master device sets the extracted device as the parameter provider (S3208). In addition, if a plurality of extracted devices exists, the master device notifies that the transfer direction determination has resulted in an error (S3209).

Thus, a configuration may be realized where the parameter provider is determined to be one device by comparing an attribute value list composed of a plurality of attribute values. In addition, by performing attribute comparisons including both master and slave devices, a communication parameter provider can be chosen from all the devices that configure the communication parameter configuration network, regardless of whether the devices are master devices or slave devices.

A communication parameter exchange sequence that is performed in the communication parameter transfer direction determination step 404 between the communication parameter provider and a receiver will now be explained.

Figure 26:
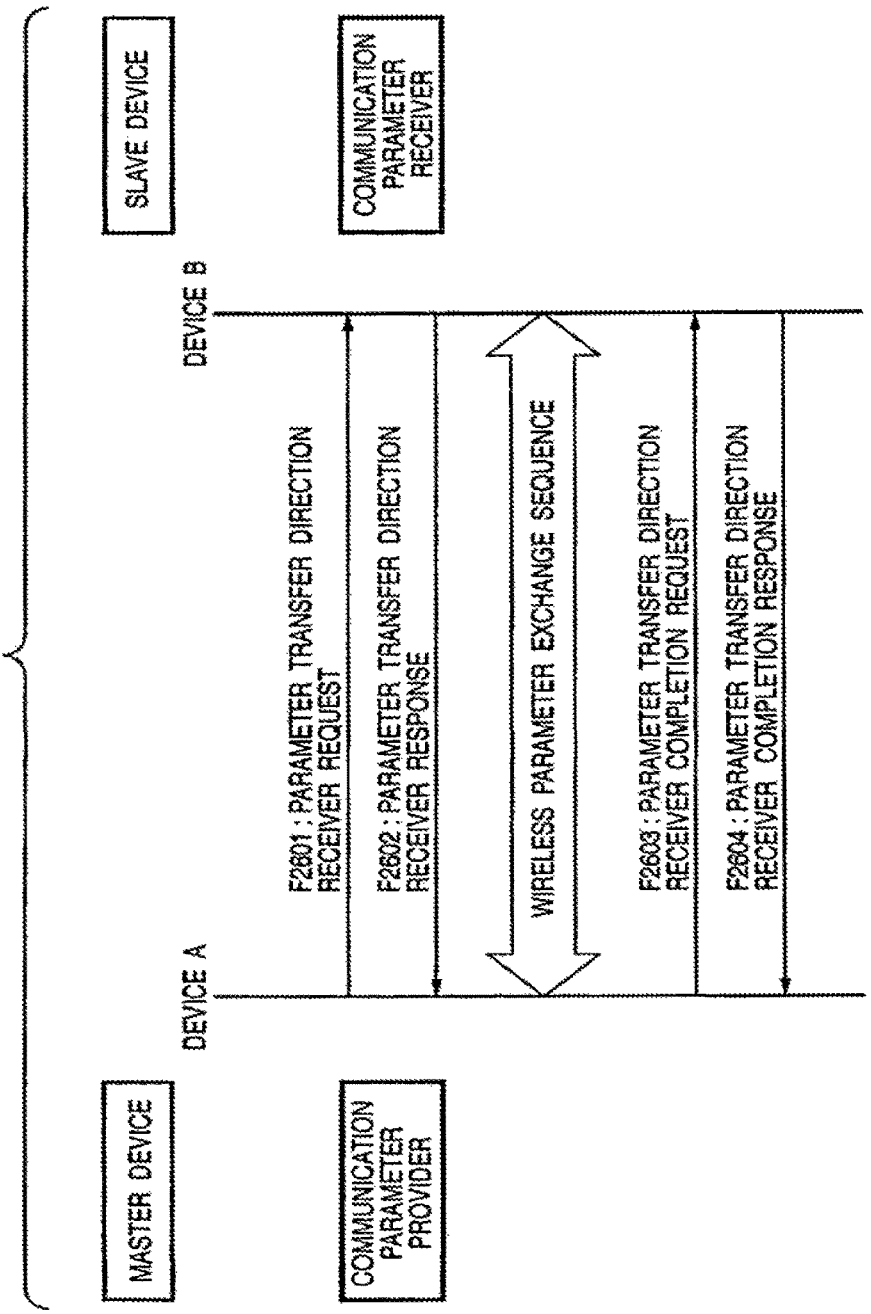
FIG. 26 is a diagram showing a sequence of providing communication parameters from a master device, the communication parameter provider, to a slave device, the receiver thereof.

First, with reference to FIG. 26, a description will be provided of a sequence that notifies, in the case where the digital camera 100 (device A) is the communication parameter provider and the printer 101 (device B) is the receiver thereof, that communication parameters will be transferred from the digital camera 100, which is the master device, to the printer 101, which is the slave device.

FIG. 26 is a diagram showing a sequence of providing communication parameters from the master device, the communication parameter provider, to the slave device, the receiver. First, the digital camera 100 transmits a "parameter transfer direction receiver request" message to the printer 101 (F2601). The printer 101, which has become a communication parameter receiver, returns a "parameter transfer direction receiver response" as a response to the digital camera 100 (F2602). Communication parameter exchange processing is performed from the digital camera 100 to the printer 101 (details will be provided later). Once processing is concluded, the digital camera 100 transmits a "parameter transfer direction receiver completion request", which indicates the completion of the processing, to the printer 101 (F2603). The printer 101 returns a "parameter transfer direction receiver completion response" message as a response to the digital camera 100 (F2604).

In addition, as shown in FIG. 31, the digital camera 100, which has become the communication parameter provider, notifies the printer 101, which has become the communication parameter receiver, its own MAC address. After receiving the address, the printer 101 stores the communication parameters transmitted from the communication parameter provider into the RAM 304 or the like.

Figure 27:
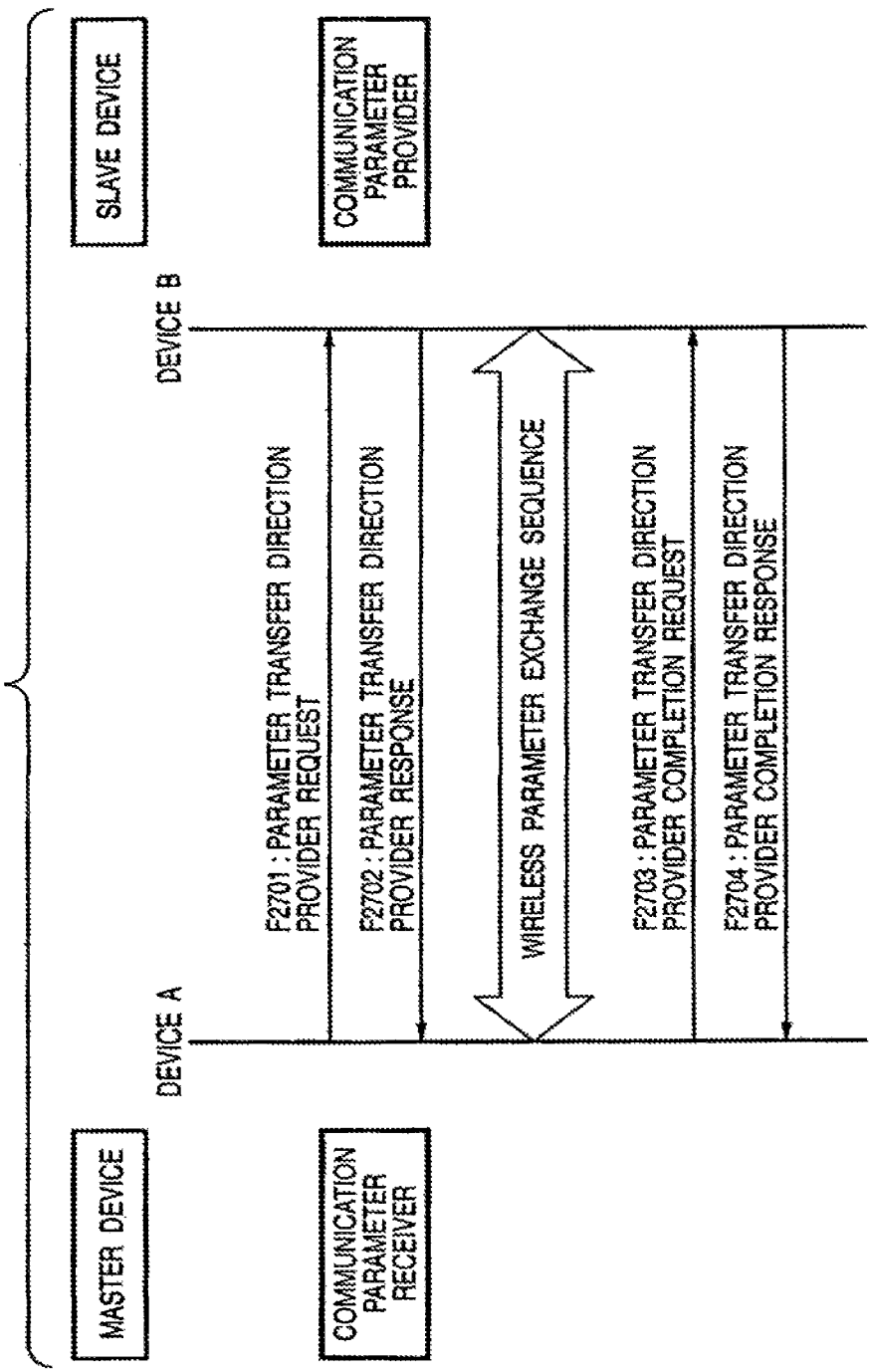
FIG. 27 is a diagram showing a sequence of receiving communication parameters at a master device, the communication parameter receiver, from a slave device, the communication parameter provider.

Next, with reference to FIG. 27, a description will be provided of a sequence for notifying, in the case where the digital camera 100 is the communication parameter receiver and the printer 101 is the provider thereof, that communication parameters will be transferred from a printer 101 (device B), which is the slave device, to a digital camera 100 (device A), which is the master device.

FIG. 27 is a diagram showing a sequence of receiving communication parameters at the master device, the communication parameter receiver, from the slave device, the communication parameter provider. First, the digital camera 100 transmits a "parameter transfer direction provider request" message to the printer 101 (F2701). The printer 101, which has become the communication parameter provider, returns a "parameter transfer direction provider response" as a response to the digital camera 100 (F2702). Communication parameter exchange processing is performed from the printer 101 to the digital camera 100 (details will be provided later). Once processing is concluded, the printer 101 transmits a "parameter transfer direction provider completion request", which indicates the completion of the processing, to the digital camera 100 (F2703). The digital camera 100 returns a "parameter transfer direction provider completion response" message as a response to the printer 101 (F2704).

In addition, as shown in FIG. 38, the digital camera 100, which has become the communication parameter receiver, notifies the printer 101, which has become the communication parameter provider, its own MAC address. After receiving the address, the printer 101 transmits the communication parameters to the digital camera 100, which has become the communication parameter receiver. The digital camera 100 stores the communication parameters transmitted from the printer 101 into the RAM 204.

As seen, it is possible to determine communication parameter receivers and providers regardless of the relationships between master and slave devices. This allows processing of network management to be performed as a function that is independent from that of communication parameter transferring.

Figure 29:
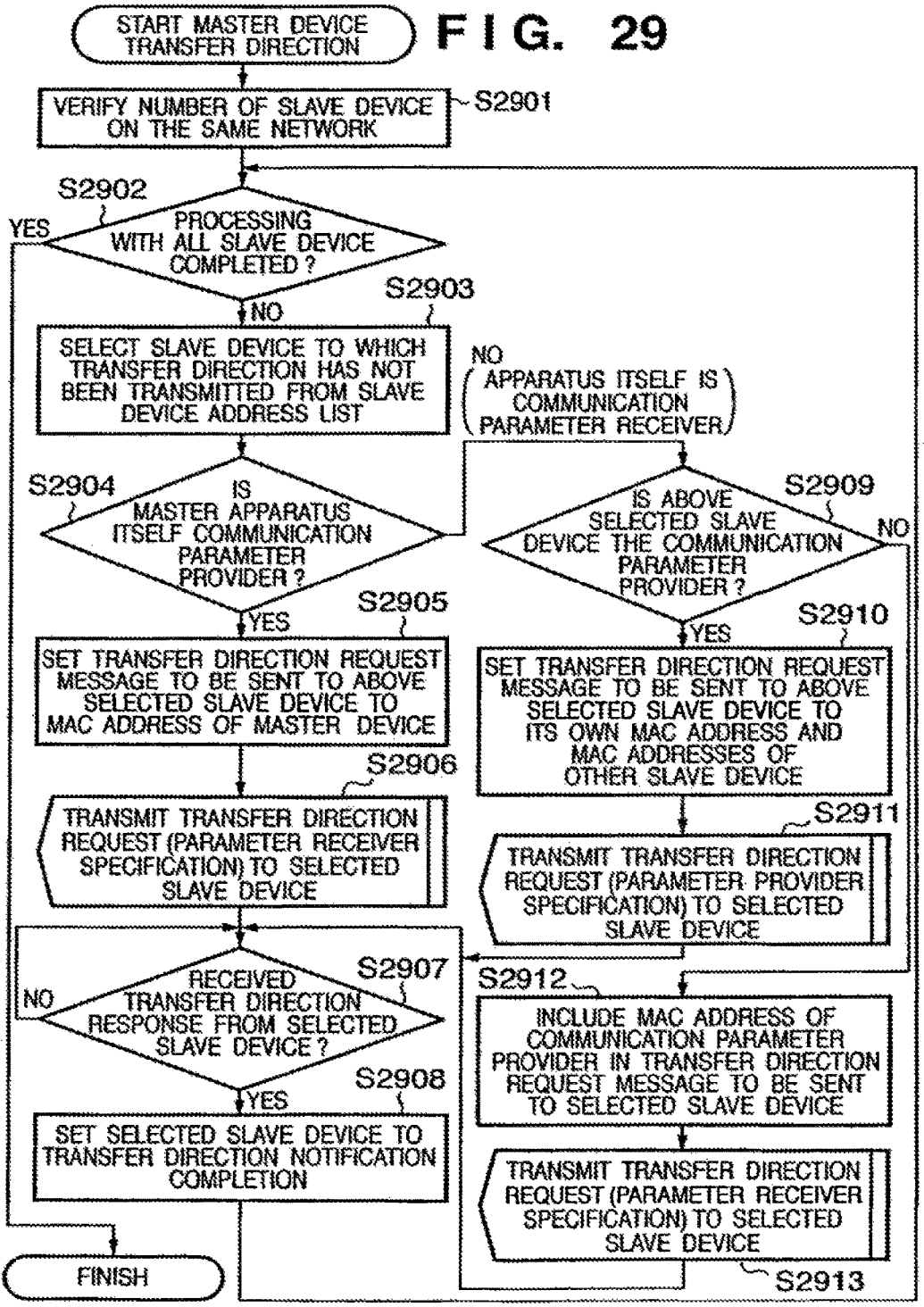
FIG. 29 is a flowchart showing master device transfer direction determination processing.

Next, with reference to FIG. 29, a description will be provided on transfer direction determination processing where the master device determines whether a device that corresponds to automatic communication parameter configuration is a communication parameter provider or a communication parameter receiver.

FIG. 29 is a flowchart showing master device transfer direction determination processing. First, the device A, which is the master device, verifies the number of slave devices existing on the same network (S2901). Next, the master device checks whether processing with all slave devices has been concluded (S2902). If not, the master device selects slave devices that have not yet received notification of the parameter transfer direction from those on the slave device address list (S2903). The master device checks whether the master device itself has become the communication parameter provider (S2904). If so, the master device sets the transfer direction request message to be sent to the slave device selected in step S2903 to the MAC address of the master device, which has become the parameter provider, as shown in FIG. 31 (S2905). The master device transmits a message indicating a parameter transfer direction receiver request to the selected slave device (S2906).

The master device next waits for reception of a parameter transfer direction receiver response message from the selected slave device (S2907). After reception thereof, the master device sets the selected slave device to transfer direction notification completion (S2908), and returns to step S2902 to repeat the above described processing until all slave devices have been processed.

In addition, when the master device itself is a communication parameter receiver (S2904), the master device checks whether the selected slave device is the communication parameter provider (S2909). In the event that the selected slave device is the communication parameter provider, the master device configures the transfer direction request message to be transmitted to the slave device to the MAC address of the master device itself, which has become a parameter receiver, as shown FIG. 38, as well as the MAC addresses of other slave devices if such slave devices exist (S2910). The master device transmits a message indicating a parameter transfer direction provider request to the selected slave device (S2911).

The master device waits for reception of a parameter transfer direction provider response from the selected slave device (S2907). After reception, the master device sets the selected slave device to transfer direction notification completion (S2908), and returns to step S2902 to repeat the above described processing until all slave device have been processed.

In addition, when the master device itself and the selected slave device are both communication parameter receivers (S2904 and S2909), the transfer direction request message to be sent to the selected slave device is set to the MAC address of the slave device that has become the parameter provider (S2912). A message indicating a parameter transfer direction receiver request is transmitted to the selected slave device (S2913).

The master device waits for reception of a parameter transfer direction receiver response from the selected slave device (S2907). After reception, the master device sets the selected slave device to transfer direction notification completion (S2908), and returns to step S2902 to repeat the above described processing until all slave devices have been processed.

Figure 30:
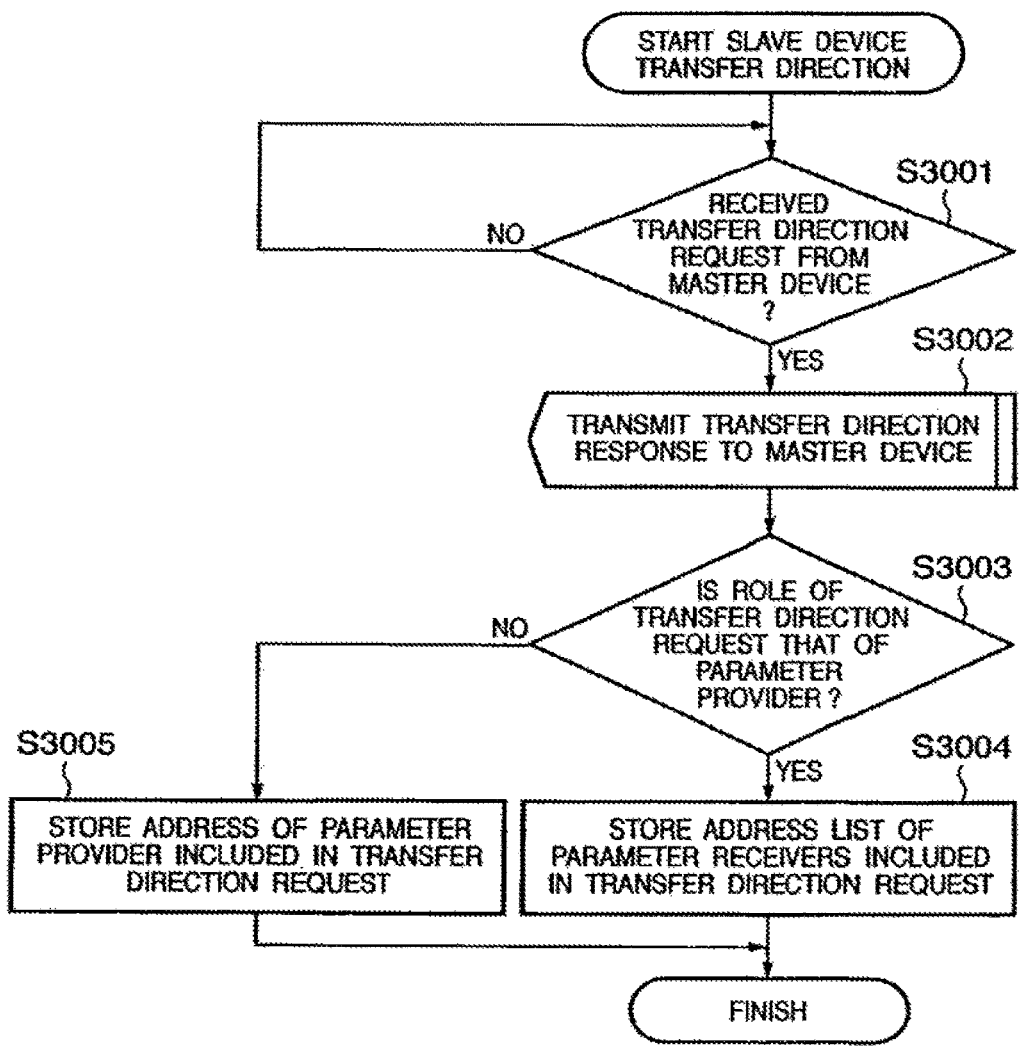
FIG. 30 is a flowchart showing slave device transfer direction determination processing.

Next, with reference to FIG. 30, a description will be provided of transfer direction determination processing where a slave device determines whether a device corresponding to automatic communication parameter configuration is a communication parameter provider or a communication parameter receiver.

FIG. 30 is a flowchart showing slave device transfer direction determination processing. The slave device first checks reception of a communication parameter transfer direction request message from the master device (S3001). After receiving the message, the slave device transmits a communication parameter transfer direction response message to the master device (S3002). At this point, if the role of the transfer direction request from the master device is that of a communication parameter provider (YES in S3003), the slave device stores the list of MAC addresses of the communication parameter receivers included in the communication parameter transfer direction request message (S3004). In addition, if the role of the transfer direction request from the master device is that of a communication parameter receiver (NO in S3003), the slave device stores the MAC address of the communication parameter provider included in the communication parameter transfer direction request (S3005).

As seen, by performing processing between the master device and the slave device to indicate statuses as either a provider or a receiver, it is now possible to clarify the destinations for each device when exchanging communication parameters without having the user instruct in advance a parameter transfer direction.

FIG. 33 is a diagram showing a sequence for transmitting and receiving communication parameter data between a communication parameter provider and a receiver. In the described example, the digital camera 100 will act as the communication parameter provider, while the printer 101 will act as a receiver.

The digital camera 100, which has become the communication parameter provider, requests input of an identification number to the printer 101 prior to the transmitting and receiving of communication parameters (F3301). In response to the request for an identification number, the printer 101 returns data that includes the value of its identification number (F3302). Next, an encryption key configuration request message is sent from the digital camera 100 to the printer 101 (F3303). After receiving the message, the printer 101 returns an encryption key configuration response to the digital camera 100 (F3304).

Proceeding to data request processing, the digital camera 100 transmits communication parameter data to the printer 101. When doing so, the digital camera 100 encrypts the communication parameter data with the encryption key. In addition, since it will be necessary to split up the communication parameter data if it is sufficiently large, a continue signal that indicates continuation of data is attached to the transmitted data (F3305). In response, the printer 101 returns a further request in the event that the data request processing results in a continue signal, and a response signal indicating the termination of data transmission in the event of an OK status, to the digital camera 100 (F3306).

Afterwards, the printer 101 decrypts the completely received communication parameter data with the above encryption key, and stores the decrypted communication parameter data.

As seen, by individually encrypting the communication parameter portion that constitutes the highest security concern among the first embodiment, in addition to encrypting the communication itself, communication parameter transfer with enhanced security can be achieved.

The operations by the device that has become a communication parameter provider (in this example, the digital camera 100) in the event that communication parameter data is exchanged between the provider and a receiver (in this example, the printer 101) will now be described in detail.

Figure 34B:
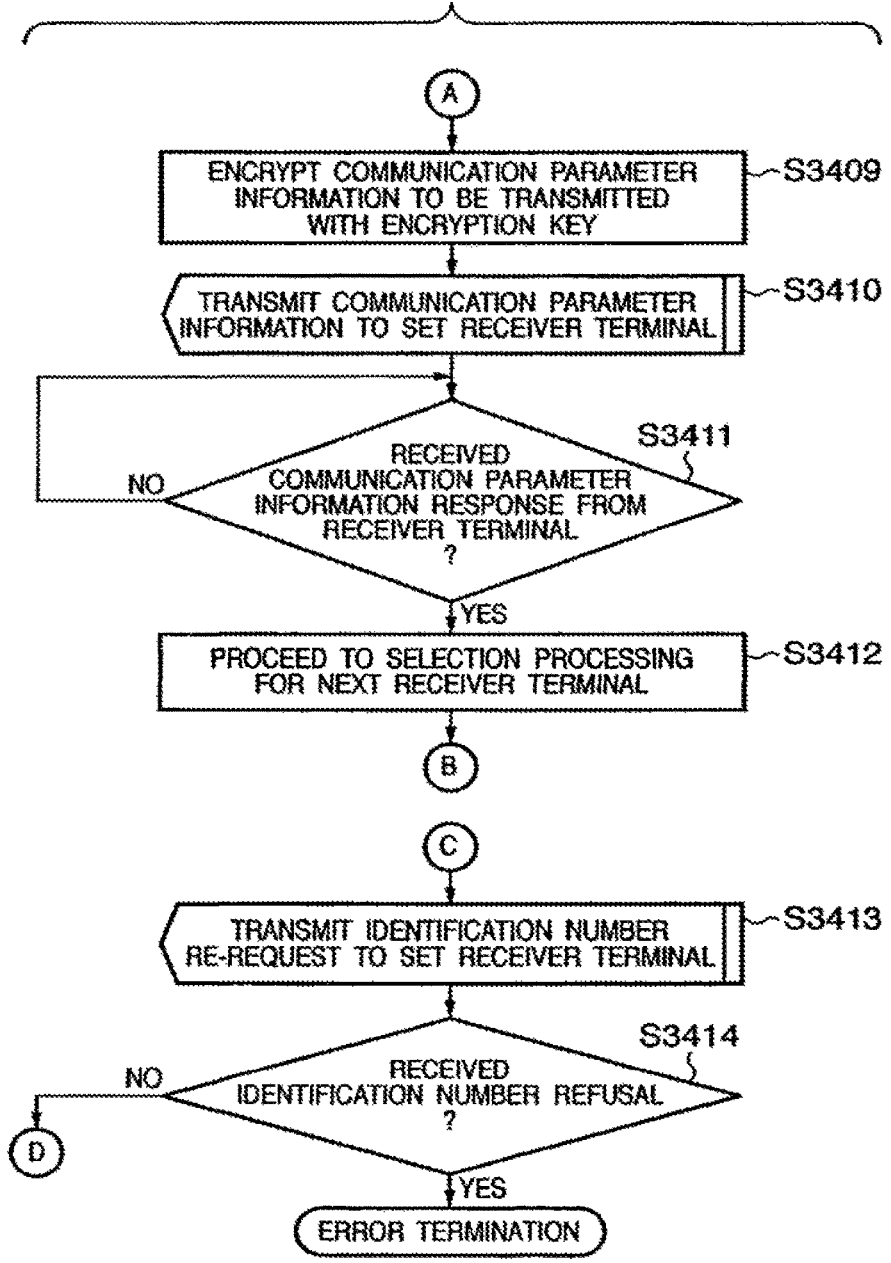

FIGS. 34A and 34B are flowcharts showing processing at a device providing communication parameters. First, the digital camera 100, which is the communication parameter provider, configures and stores the number of communication parameter receivers, to which it must transfer communication parameter information, to the RAM 204 of the digital camera 100 (S3401). The digital camera 100 checks whether transmission of communication parameters to all the devices that will become communication parameter receivers has been concluded (S3402). If so, normal termination is processed. Otherwise, the following processing is repeated.

First, the address of a parameter receiver device that has not yet received the communication parameters is configured as a destination address (S3403). Next, identification number request messages are transmitted to the parameter receiver device indicated by the configured destination address (S3404). The digital camera waits to receive an identification number response message from the parameter receiver device (S3405). Upon reception, the digital camera checks whether the identification number included in the identification number response message is correct (S3406).

If the response identification number is correct, the digital camera proceeds to transmit an encryption key request message to the parameter receiver device (S3407), and waits to receive an encryption key response message from the parameter receiver device (S3408). Upon reception, the digital camera uses the encryption key transmitted as the encryption response message to encrypt the communication parameter information to be transmitted (S3409). The encrypted communication parameter information is transmitted to the parameter receiver device (S3410). The digital camera waits to receive a communication parameter information response message from the receiver device (S3411).

Upon reception, the digital camera proceeds to the processing for selecting the next parameter receiver device (S3412).

If the digital camera determines that the identification number included in the identification number response message received from the parameter receiver device is not correct (NO in S3406), the digital camera transmits an identification number re-request to the parameter receiver device (S3413). If a refusal message is received as a response to the identification number re-request (YES in S3414), an error termination is processed. Meanwhile, if an identification number response message is received (YES in S3405) instead of a refusal message to the identification number request, the above described processing is repeated.

The operations by the device that has become a communication parameter receiver (in this example, the printer 101) in the event that communication parameter data is exchanged between the provider (in this example, the digital camera 100) and a receiver will now be described in detail.

Figure 35:
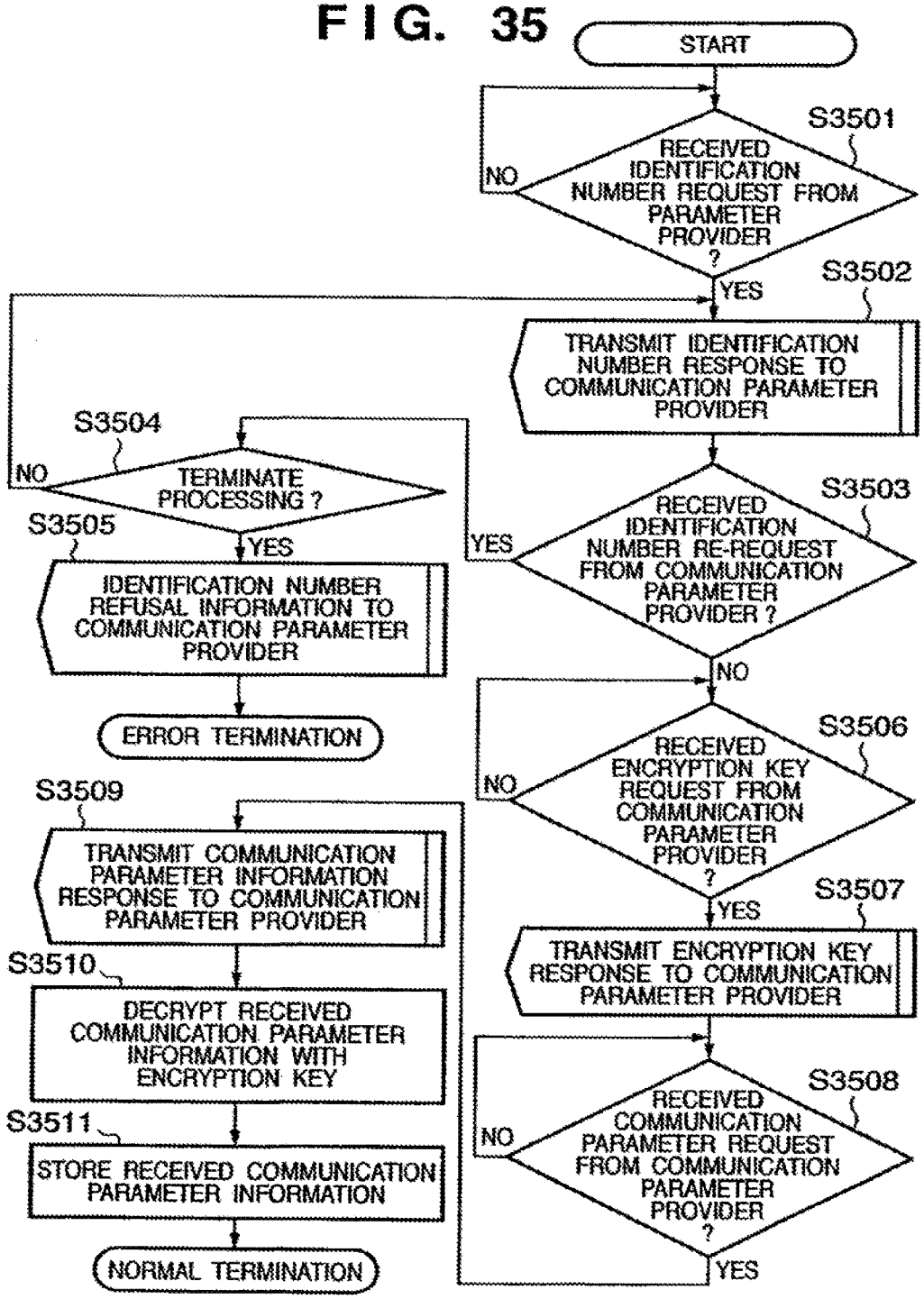
FIG. 35 is a flowchart showing processing at a device that receives communication parameters.

FIG. 35 is a flowchart showing processing at a device receiving communication parameters. First, the printer 101, which is a communication parameter receiver, waits to receive an identification number request message from the digital camera 100, which is the communication parameter provider (S3501). When the request is received, the printer 101 performs displaying to prompt the user to input an identification number at the operating unit 311, and transmits the identification number inputted by the user as an identification number response message to the communication parameter provider device (S3502). When an identification number re-request message is received from the communication parameter provider device (YES in S3503), since it is possible that the identification number had been erroneously inputted, the printer 101 displays an inquiry as to whether processing should be aborted to the display unit 310 of the printer 101. If a cancel instruction or the like indicating that operations should be aborted is inputted via the operating unit 311 (YES in S3504), the printer 101 transmits an identification number request refusal message to the digital camera 100, and an error termination is processed (S3505).

If the identification number has been inputted correctly, the printer 101 waits to receive an encryption key request to be transmitted by the communication parameter provider device (S3506), and transmits an encryption key as a response to the digital camera 100, which is the communication parameter provider (S3507). The printer 101 waits to receive a communication parameter request message from the communication parameter provider device (S3508). Upon receiving the communication parameter request message, the printer 101 transmits a communication parameter response message to the communication parameter provider device (S3509). The printer 101 decrypts the communication parameter request message with the encryption key to acquire the communication parameters (S3510). The communication parameters are stored to process normal termination (S3511).

After storing the communication parameter information in step S3511, by configuring the communication parameters as the communication parameters for a new network, each device will exit the communication parameter configuration network to form the new network.

Second Embodiment

Next, a second embodiment of the present invention will be described in detail with reference to the drawings. While a description of automatic communication parameter configuration between two devices has been provided for the first embodiment, the description of the second embodiment will focus on the characteristic portions of automatic communication parameter configuration among a plurality of devices.

Figure 40:
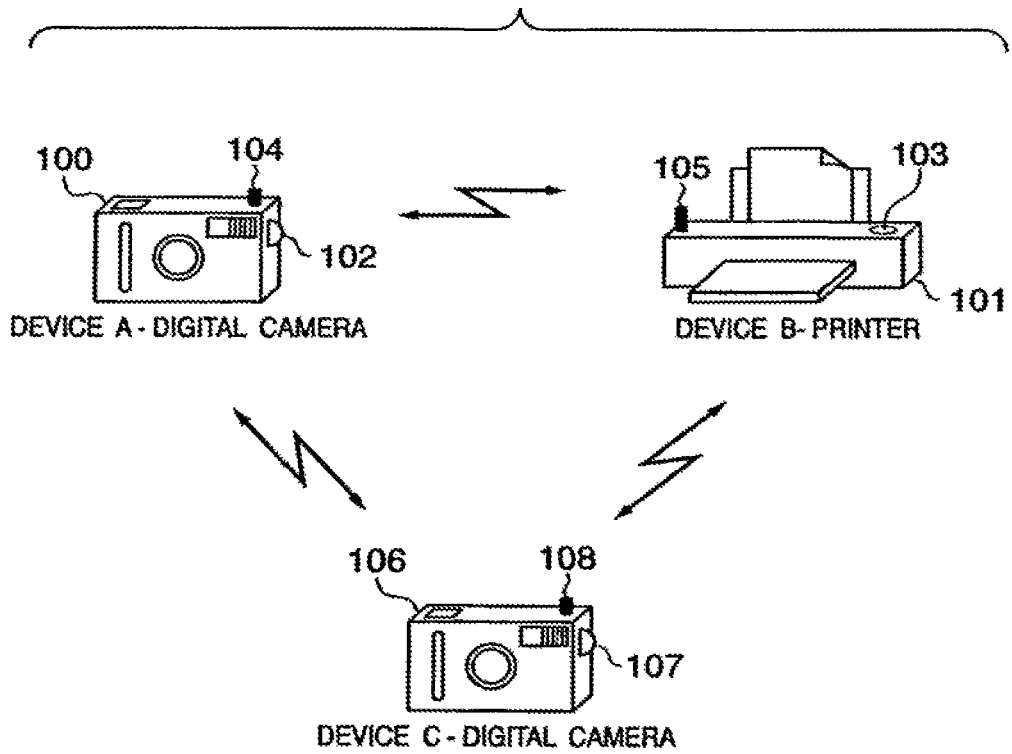
FIG. 40 is a diagram showing an example of a configuration of a wireless LAN according to the second embodiment.

FIG. 40 is a diagram showing an example of a configuration of a wireless LAN according to the second embodiment. As shown in FIG. 40, wireless communication devices A, B and C are respectively a digital camera 100, a printer 101 and a digital camera 106. Wireless communication parameter configuration for ad hoc communication is to be performed among these three devices.

The digital camera 100 is wireless LAN-capable through its wireless communication function 104, and is able to configure a network in communication parameter configuration mode when a user presses a communication parameter configuration activation button 102. The printer 101 also is wireless LAN-capable through its wireless communication function 105, and is able to configure a network in communication parameter configuration mode when a user presses a communication parameter configuration activation button 103. Furthermore, the digital camera 106 also is wireless LAN-capable through its wireless communication function 108, and is able to configure a network in communication parameter configuration mode when a user presses a communication parameter configuration activation button 107.

Incidentally, the configurations of the digital cameras 100 (device A), 106 (device C) and the printer 101 (device B) are the same as the configuration explained for the first embodiment using FIGS. 2 and 3, and further description will be omitted here.

Next, processing for determining a master device and slave devices among the devices A, B and C shown in FIG. 2, in the event that a master device does not exist within the ad hoc network, as was the case with the first embodiment, will be described using FIG. 21.

Figure 21:
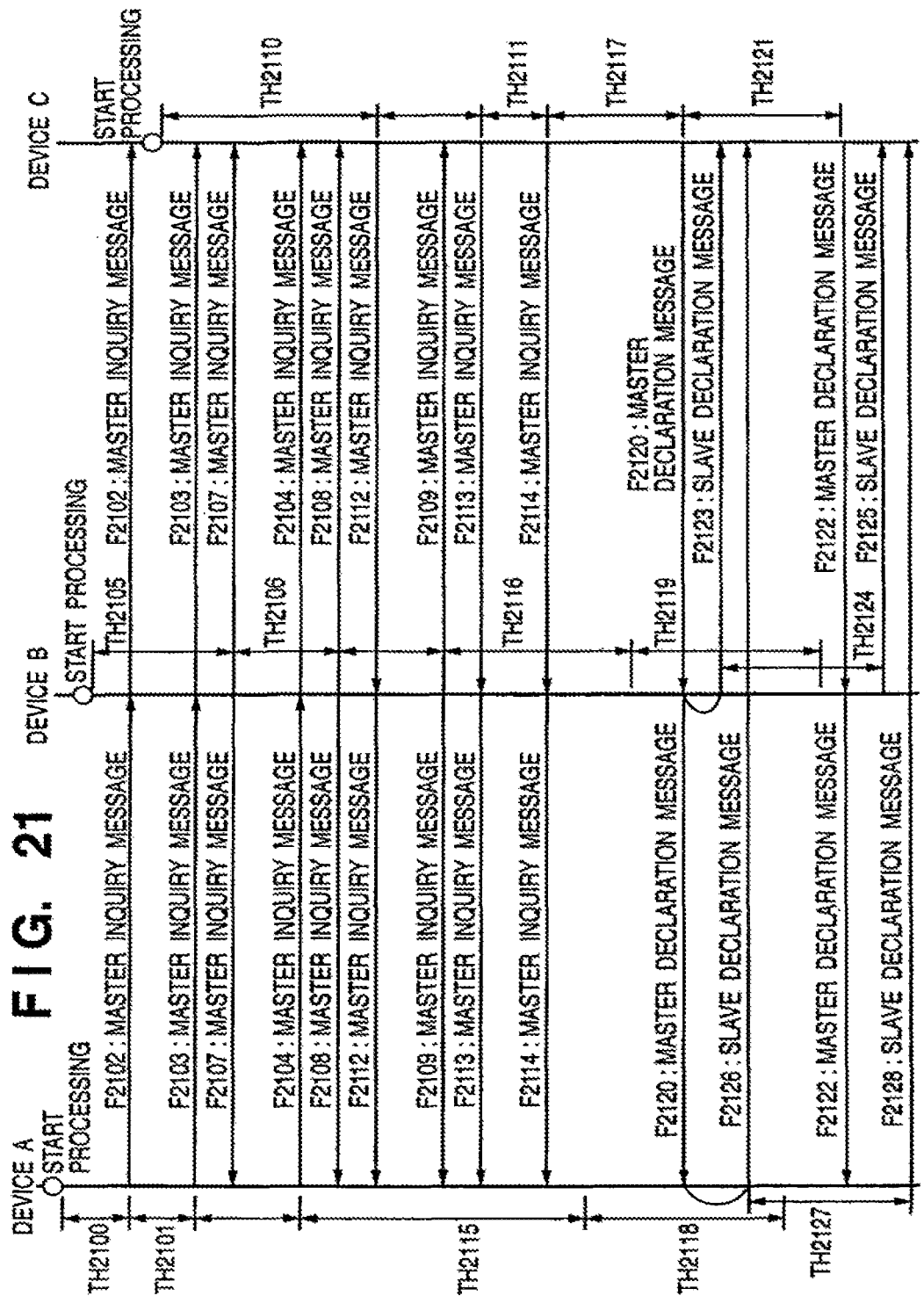
FIG. 21 is a diagram showing a sequence for determining a master device and a slave device according to a second embodiment.

FIG. 21 is a diagram showing a sequence for determining a master device and a slave device according to a second embodiment. The example shown in FIG. 21 illustrates a case where the device A first initiates processing, followed by device B, and finally by device C. In addition, this example assumes that the descending lexicographic order of the MAC addresses of the devices is: C, A and B.

After initiating processing, the device A activates a random timer over a master inquiry activation time (TH2100) to wait for message transmission.

Afterwards, as the random timer times out, the device A sets a master inquiry transmission timer to a master inquiry transmission interval (TH2101) and activates the timer. The device A transmits a master inquiry message upon each timeout of the master inquiry transmission timer. In this example, the master inquiry message is transmitted three times (F2102, F2103 and F2104).

After initiating processing, the device B activates a random timer over a master inquiry activation time (TH2105) to wait for message transmission.

Afterwards, as the random timer times out, the device B sets a master inquiry transmission timer to a master inquiry transmission interval (TH2106) and activates the timer. The device B transmits a master inquiry message three times upon each timeout of the master inquiry transmission timer (F2107, F2108 and F2109).

After initiating processing, the device C activates a random timer over a master inquiry activation time (TH2110) to wait for message transmission.

Afterwards, as the random timer times out, the device C sets a master inquiry transmission timer to a master inquiry transmission interval (TH2111) and activates the timer. The device C transmits a master inquiry message three times upon each timeout of the master inquiry transmission timer (F2112, F2113 and F2114).

After transmitting the master inquiry message, the device A next activates a master declaration reception timer, and waits to receive a message for a master inquiry response waiting time (TH2115). In this example, the device A performs master collision resolution processing twice since it receives master inquiry messages from the devices B and C during the predetermined amount of time (TH2115).

As was the case in the first embodiment, the master collision resolution processing of the second embodiment will determine the device A to be a winner against the device B, and a loser against the device C. Therefore, after timeout of the master declaration reception timer, the device A activates a master declaration reception waiting timer, and waits for a predetermined amount of time (TH2118) for the transmission of the master declaration message (comparable to the processing of S820 shown in FIG. 8).

After transmitting the master inquiry message, the device B activates a master declaration reception timer, and waits to receive a message for a master inquiry response waiting time (TH2116). In this example, the device B performs master collision resolution processing since it receives a master inquiry message from the device C during the predetermined amount of time (TH2116).

As was the case in the first embodiment, it is assumed that the master collision resolution processing of the second embodiment will determine the device B to be a loser against the device C. Therefore, after timeout of the master declaration reception timer, the device B activates a master declaration reception waiting timer, and waits for a predetermined amount of time (TH2119) for the transmission of the master declaration message.

In addition, after transmitting the master inquiry message, the device C activates a master declaration reception timer, and waits to receive a message for a master inquiry response waiting time (TH2117). In this example, the device C will not receive a master inquiry message during the predetermined amount of time (TH2117). Therefore, after timeout of the master declaration reception timer, the device C notifies the other device that it is the master device by broadcasting a master declaration message (F2120).

After transmitting the master declaration message, the device C sets the master declaration transmission timer to a master declaration transmission interval (TH2121) and activates the timer. The device A periodically broadcasts the master declaration message every time the master declaration transmission timer times out (F2122).

This enables the device B to detect that the device C is the master device since it receives a master declaration message from the device C during the predetermined time (TH2119). The device B registers the MAC address of the device C into the master device management table. The device B also sets the master device expire timer to the expire time of the device C acquired from the master declaration message and activates the timer, and transmits a slave declaration message to the device C (F2123).

After transmitting the slave declaration message, the device B sets the slave declaration transmission timer to a slave declaration transmission interval (TH2124) and activates the timer. The device B periodically transmits the slave declaration message to the device C every time the slave declaration transmission timer times out (F2125).

Meanwhile, the device A detects that the device C is the master device since it receives a master declaration message from the device C during the predetermined time (TH2118). The device A registers the MAC address of the device C into the master device management table. The device A also sets the master device expire timer to the expire time of the device C acquired from the master declaration message and activates the timer, and transmits a slave declaration message to the device C (F2126).

After transmitting the slave declaration message, the device A sets the slave declaration transmission timer to a slave declaration transmission interval (TH2127) and activates the timer. The device A periodically transmits the slave declaration message to the device C every time the slave declaration transmission timer times out (F2128).

In the second embodiment shown in FIG. 21, master and slave devices are determined by the procedures described above.

Next, the device capability information collection step 403 of the second embodiment, where the master device determined by the master device determination step 402, in the same way as in the first embodiment, collects device capability information from slave devices participating in the same network will be explained.

Figure 23:
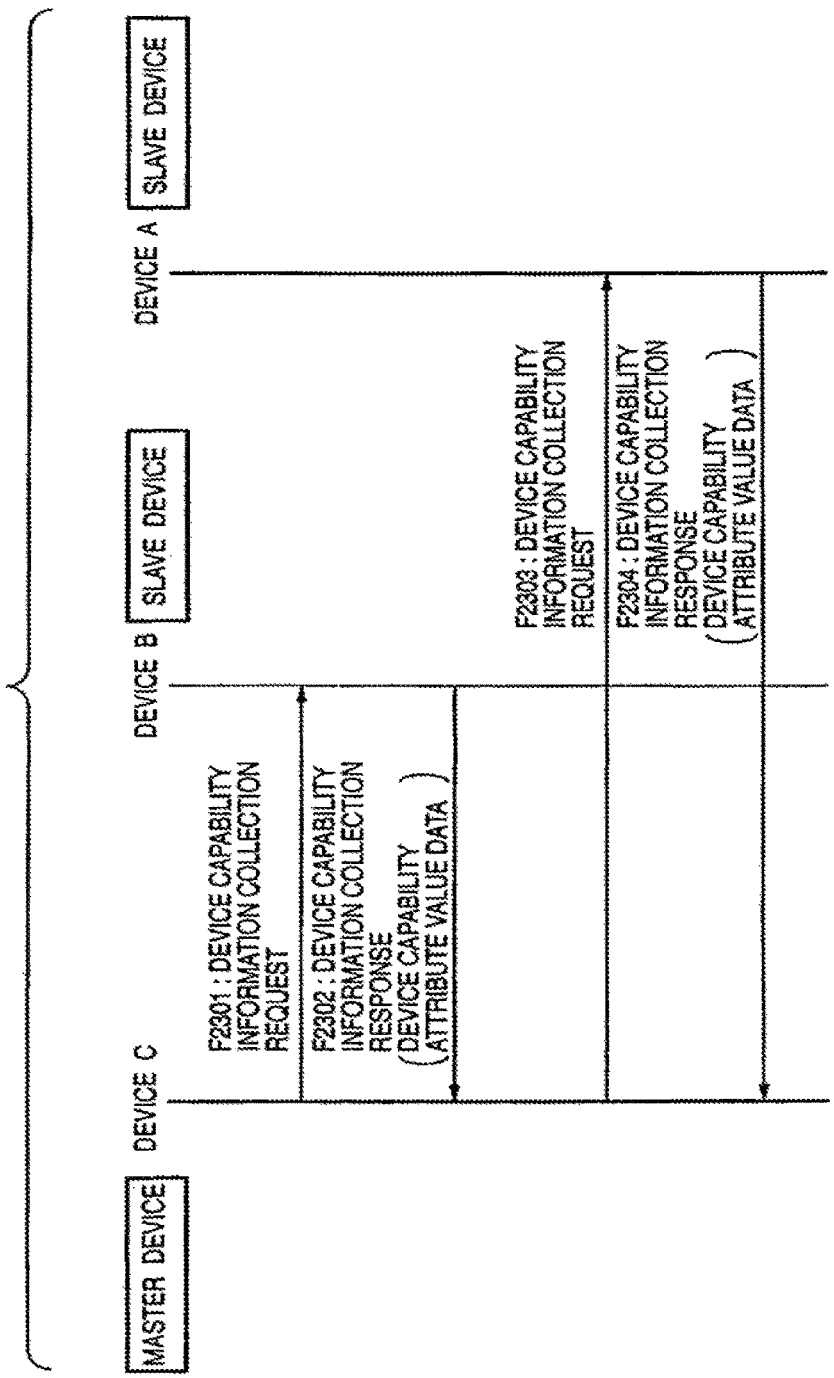
FIG. 23 is a diagram showing a sequence of collection of information on device capability by a master device, a digital camera 200 (device A), from slave device, a printer 201 (device B) and a digital camera 202 (device C)

FIG. 23 is a diagram showing a sequence of collection of information on device capability as a master device by the digital camera 106 (device C) from the printer 101 (device B) and the digital camera 100 (device A) as slave devices. A detailed description will be provided below.

First, as the master device, in order to collect device capability attribute data of the slave devices currently existing on the same network, the digital camera 106 (device C) transmits a device capability information collection request towards the printer 101 (device B) (F2301). Upon receiving the request, the printer 101 returns a device capability information collection response that includes its own device capability attribute values (F2302).

In addition, the digital camera 106 (device C) transmits a device capability information collection request towards the digital camera 100 (device A) (F2303). Upon receiving the request, the digital camera 100 returns a device capability information collection response that includes its own device capability attribute values (F2304).

As seen, the digital camera 106, which is the master device, collects device capability attribute data of all slave devices currently existing on the same network. By having the master device perform collection, as a network administrator, of device capability attribute data of each slave device existing on the same network, prompt device capability information collection by the master device upon participation of a slave device at a given point in time, even when three or more devices exist on the same network, becomes possible.

Figure 25:
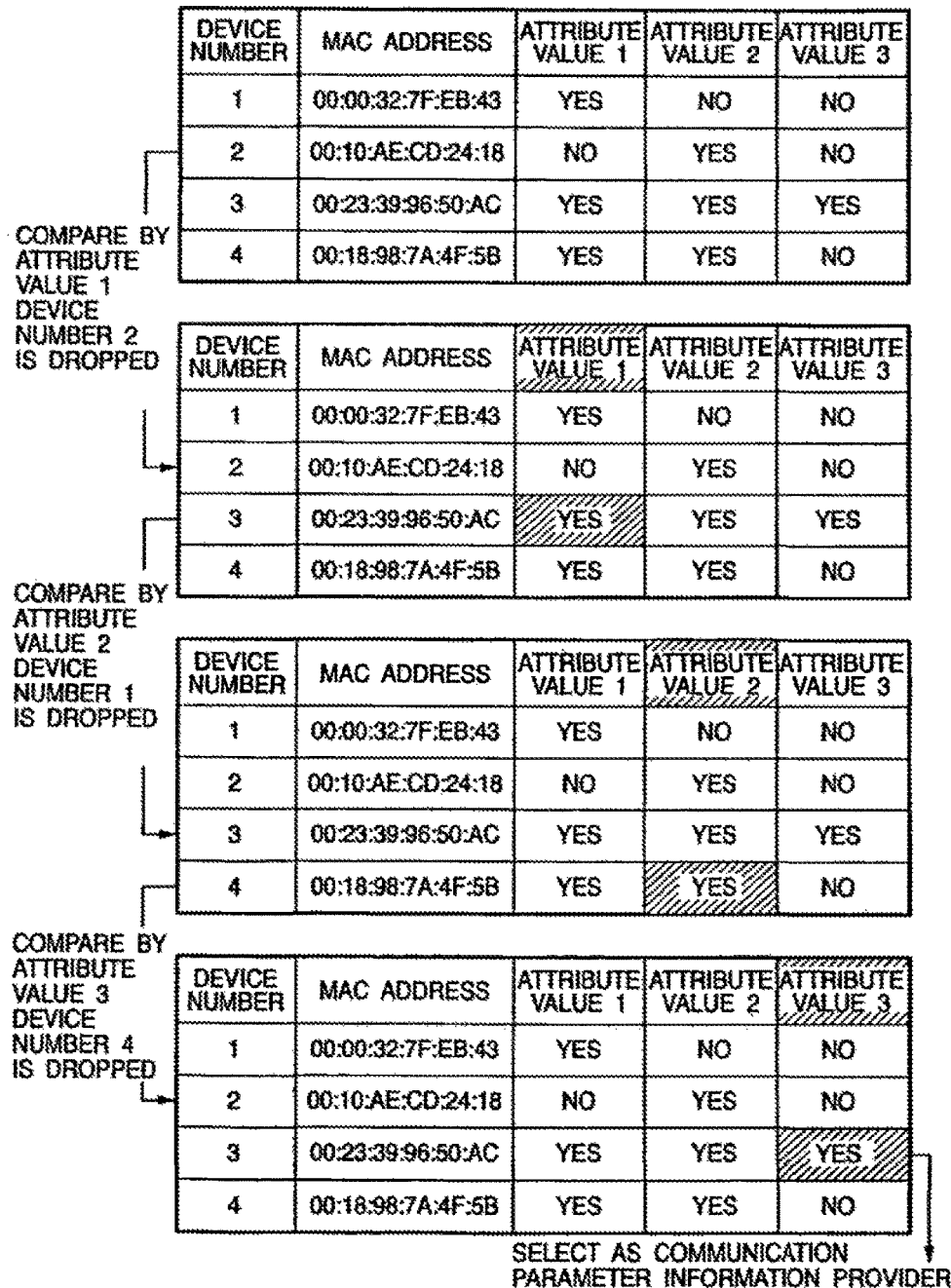
FIG. 25 is a diagram showing a device capability attribute table after collection of device capability attributes from all devices on the same network by a master device.

FIG. 25 is a diagram showing a device capability attribute table after collection of device capability attributes from all devices on the same network by a master device. A description of how a communication parameter information provider is determined from these device capability attribute values will now be provided.

Incidentally, the processing of the first embodiment for transfer direction determination of communication parameters, explained earlier with reference to FIG. 32, may be applied for this determination processing.

First, filtering is performed in respect to the attribute value 1. The devices that have the function of the attribute value 1, i.e. the devices with "YES" as their attribute value 1, become candidates for the next comparison step. Thus, as shown in FIG. 25, device number 2 will be dropped out from the list of comparison objects since the attribute value 1 of device number 2 is "NO".

Next, a comparison in respect to the attribute number 2 will be performed against remaining device numbers 1, 3 and 4. In this case, device number 1 will be dropped out from the list of comparison objects since its attribute value 2 is "NO".

Next, a comparison in respect to the attribute number 3 will be performed against device numbers 3 and 4. In this case, since the attribute value 3 of device number 3 is "YES", device number 3 will be retained and selected as the communication parameter information provider.

As seen, an eventual communication parameter information provider can be determined by performing sequential filtering using an attribute value list comprised of a plurality of attribute values. In addition, by weighting the plurality of attribute values, it becomes possible to select a device that has certain device capabilities as the communication parameter information provider.

Next, using FIG. 28, for a case where the digital camera 100 (device A) and the printer 101 (device B) are slave devices and the digital camera 106 (device C) is a master device, a sequence will be explained where the digital camera 106 (device C), which is the master device, notifies the digital camera 100 (device A), which is a slave device, that it is a communication parameter receiver, and notifies the printer 101 (device B), which is a slave device, that it is a communication parameter provider, and finally transfers the communication parameters from the device B to the devices A and C.

This processing is the same as that explained for the first embodiment using FIG. 29.

Figure 28:
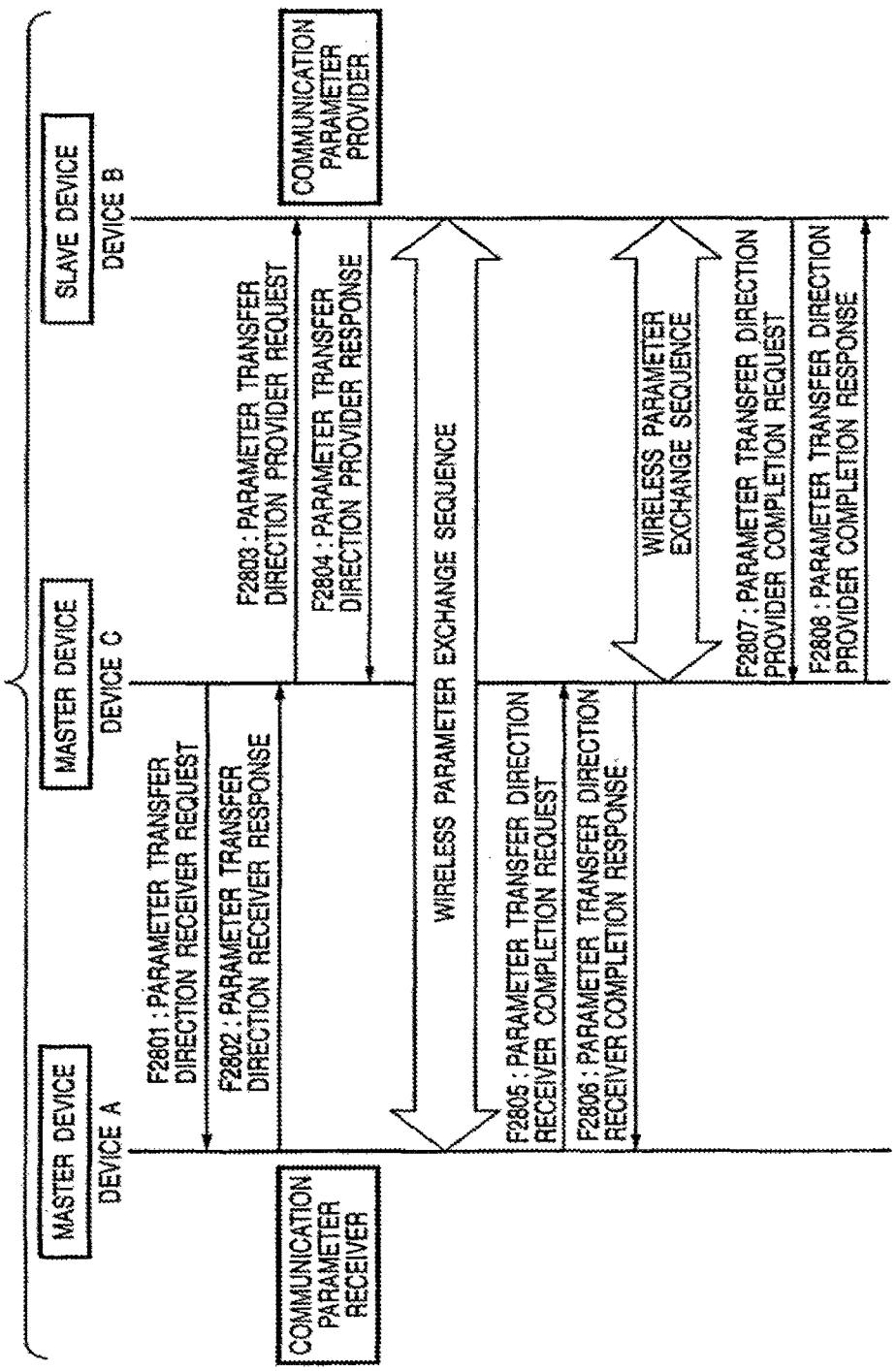
FIG. 28 is a diagram showing a transferring sequence of communication parameters according to the second embodiment.

FIG. 28 is a diagram showing a transferring sequence of communication parameters according to the second embodiment. It is assumed that the digital camera 106 (device C), which is the master device, has determined through the earlier processing for determining the communication parameter provider that the digital camera 100 (device A), which is a slave device, will be a communication parameter receiver, and that the printer 101 (device B), which is a slave device, will be the communication parameter provider.

The digital camera 106 (device C) transmits a "parameter transfer direction receiver request" message that includes an address of the communication parameter provider, as shown in FIG. 31, to the digital camera 100 (device A) to request that it become a communication parameter receiver (F2801). In response, the digital camera 100 returns a "parameter transfer direction receiver response" message to accept its appointment as a communication parameter receiver (F2802).

In similar fashion, the digital camera 106 (device C) transmits a "parameter transfer direction provider request" message that includes the addresses of all communication parameter receivers, as shown in FIG. 39 (six receiver devices are shown in FIG. 39), to the printer 101 (device B) to request that it become a communication parameter provider (F2803). In response, the printer 101 returns a "parameter transfer direction provider response" message to accept its appointment as a communication parameter provider (F2804).

The printer 101 (device B) performs a wireless parameter exchange sequence with the digital camera 100 (device A). After completion of the sequence, the digital camera 100 requests a "parameter transfer direction receiver completion request" message, which indicates the completion of the communication parameter receiver processing, to the digital camera 106 (device C), which is the master device (F2805).

In response, the digital camera 106 returns a "parameter transfer direction receiver completion response" message (F2806).

In addition, the digital camera 106 (device C) and the printer 101 (device B) also perform a wireless parameter exchange sequence. After completion of the sequence, the printer 101 requests a "parameter transfer direction provider completion request" message, which indicates the completion of the communication parameter provider processing, to the digital camera 106 (device C), which is the master device (F2807). In response, the digital camera 106 returns a "parameter transfer direction provider completion response" message (F2808). By configuring the communication parameters provided by the communication parameter provider as the communication parameters for a new network, each device will exit the communication parameter configuration network to form the new network.

In addition, while not clearly described for the second embodiment, in the event that the master device itself becomes a communication parameter receiver, the sequence of transmitting transfer direction requests to each slave device will commence with the master device transmitting communication parameter receiver response messages to each slave device that has become a communication parameter receiver. A sequencing rule will be applied to slave devices that have become communication parameter receivers to transmit communication parameter provider request messages. This eliminates the need for the communication parameter provider to check whether each communication parameter receiver has already received a become communication parameter receiver message from the master device, even among a plurality of devices. In addition, processing may instantly proceed to a wireless parameter exchange sequence without having to consider the sequence of parameter receivers.

Other Embodiments

While a wireless LAN was given as an example of wireless communication described in the first and second embodiments, the present invention may be applied to other wireless communication methods including Bluetooth (registered trademark), Wireless USB, Wireless 1394, UWB and WiMAX.

The present invention may be applied to both systems comprising a plurality of devices (for example, a host computer, an interface device, a reader or a printer), and apparatuses composed of a single device (for example, a copying machine or facsimile machine).

It is obvious that the object of the present invention may also be achieved by supplying a storage media that stores a program code of a software capable of achieving the functions of the described embodiments to a system or an apparatus, and having a computer (CPU or MPU) of the system or apparatus read out and execute the program stored in the storage media.

In this case, the program codes themselves, read out from the storage media, achieve the functions of the above mentioned embodiments, while the storage media containing the program codes compose the present invention.

Storage devices to which the program codes can be supplied include, for instance, a floppy disk (registered trademark), a hard disk, an optical dick, a magneto-optical disk, a CD-ROM, a CD-R, a magnetic tape, a nonvolatile memory card, a ROM or the like.

In addition, it is obvious that the functions of the aforementioned embodiments can be achieved not only by executing program codes read out by a computer, but also through processing performed by an OS (operating system) or the like, which is running on a computer, that performs a portion or all of the actual processing based on instructions from the program code.

Furthermore, it is obvious that the functions of the aforementioned embodiments can also be achieved by writing program codes read out from a storage media into either a function enhancement board inserted into a computer or a memory built into a function enhancement unit connected to a computer, and having a CPU or the like built into the function enhancement board or the function enhancement unit perform a portion or all of the actual processing based on instructions from the program code.

While the present invention has been described in its preferred embodiments, it is to be understood that the present invention is not limited to the embodiments described above, and a wide range of variations may be made within the scope of the following claims.

This application claims the benefit of Japanese Application No. 2005-130480 filed on Apr. 27, 2005, which is hereby incorporated by reference herein in its entirety.

What is claimed is:

1. A communication apparatus comprising:
   a processor; and
   a memory including a second value and instructions that, when executed by the processor, cause the apparatus to:
   obtain a first value which another communication apparatus has, wherein the first value is used to determine a provider apparatus which provides a communication parameter including an identifier of a wireless network in accordance with IEEE802.11 series;
   compare the first value with the second value, wherein the second value is used to determine the provider apparatus;
   determine the provider apparatus among the communication apparatus and said another communication apparatus in a case where the first value is not identical with the second value;
   use a third value with a fourth value in order to determine the provider apparatus among the communication apparatus and said another communication apparatus in a case where the provider apparatus is not determined through comparison of the first value with the second value because the first value is identical with the second value, wherein the third value is obtained from said another communication apparatus, said another communication apparatus has the third value, the communication apparatus has the fourth value, and the third value and the fourth value are used to determine the provider apparatus;
   provide the communication parameter to said another apparatus by wireless communication in a case where the communication apparatus is determined to be the provider apparatus through determination based on the third value and the fourth value; and
   receive the communication parameter from said another apparatus by wireless communication in a case where the communication apparatus is determined not to be the provider apparatus through determination based on the third value and the fourth value;
   wherein in a case where the provider apparatus is determined through comparison of the first value with the second value, determination based on the third value and the fourth value is not performed.

2. The apparatus according to claim 1, wherein the instructions caused the communication apparatus to obtain the first value and the third value from said another communication apparatus by wireless communication.

3. The apparatus according to claim 1, wherein the communication apparatus is a digital camera.

4. The apparatus according to claim 1, wherein the communication parameter further includes at least one of information of an encryption method or an authentication method which are used in the wireless network.

5. The apparatus according to claim 1, further comprising a wireless transmitter configured to provide the communication parameter to said another apparatus by wireless communication, and to form a network with said another apparatus using the communication parameter.

6. The apparatus according to claim 1, wherein the first value indicates what role the communication apparatus intends to play.

7. A control method of a communication apparatus which comprises a processor and a memory that has a second value, the method comprising:
   obtaining a first value which another communication apparatus has, wherein the first value is used to determine a provider apparatus which provides a communication parameter including an identifier of a wireless network in accordance with IEEE802.11 series;
   comparing the first value with the second value, wherein the second value is used to determine the provider apparatus;
   determining the provider apparatus among the communication apparatus and said another communication apparatus in a case where the first value is not identical with the second value;
   using a third value with a fourth value in order to determine the provider apparatus among the communication apparatus and said another communication apparatus in a case where the provider apparatus is not determined through comparison of the first value and the second value because the first value is identical with the second value, wherein the third value is obtained from said another communication apparatus, said another communication apparatus has the third value, the communication apparatus has the fourth value, and the third value and the fourth value are used to determine the provider apparatus;
   providing the communication parameter from the communication apparatus to said another apparatus by wireless communication in a case where the communication apparatus is determined to be the provider apparatus through determination based on the third value and the fourth value; and
   receiving the communication parameter from said another apparatus by wireless communication in a case where the communication apparatus is determined not to be the provider apparatus through determination based on the third value and the fourth value;
   wherein in a case where the provider apparatus is determined through comparison of the first value and the second value, determining based on the third value and the fourth value is not performed.

8. A non-transitory computer-readable medium storing a program thereon, wherein the program instructs a computer of a communication apparatus which comprises a memory that has a second value to:
   obtain a first value which another communication apparatus has, wherein the first value is used to determine a provider apparatus which provides a communication parameter including an identifier of a wireless network in accordance with IEEE802.11 series;
compare the first value with the second value, wherein the second value is used to determine the provider apparatus;
determine the provider apparatus among the communication apparatus and said another communication apparatus in a case where the first value is not identical with the second value;
use a third value with a fourth value in order to determine the provider apparatus among the communication apparatus and said another communication apparatus in a case where the provider apparatus is not determined through comparison of the first value and the second value because the first value is identical with the second value, wherein the third value is obtained from said another communication apparatus, said another communication apparatus has the third value, the communication apparatus has the fourth value, and the third value and the fourth value are used to determine the provider apparatus;
provide the communication parameter to said another apparatus by wireless communication in a case where the communication apparatus is determined to be the provider apparatus through determination based on the third value and the fourth value; and
receive the communication parameter from said another apparatus by wireless communication in a case where the communication apparatus is determined not to be the provider apparatus through determination based on the third value and the fourth value;
wherein in a case where the provider apparatus is determined through comparison of the first value and the second value, determination based on the third value and the fourth value is not performed.

* * * * *